United States Patent
Arunachalam et al.

(10) Patent No.: US 10,225,313 B2
(45) Date of Patent: Mar. 5, 2019

(54) MEDIA QUALITY PREDICTION FOR COLLABORATION SERVICES

(71) Applicant: Cisco Technology, Inc., San Jose, CA (US)

(72) Inventors: Chidambaram Arunachalam, Cary, NC (US); Gonzalo Salgueiro, Raleigh, NC (US); Nagendra Kumar Nainar, Morrisville, NC (US); Eric Chen, Palo Alto, CA (US); Keith Griffin, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/663,658

(22) Filed: Jul. 28, 2017

(65) Prior Publication Data

US 2019/0037002 A1    Jan. 31, 2019

Related U.S. Application Data

(63) Continuation of application No. 15/659,356, filed on Jul. 25, 2017.

(51) Int. Cl.
*H04M 1/24* (2006.01)
*H04M 3/08* (2006.01)
(Continued)

(52) U.S. Cl.
CPC .............. *H04L 65/80* (2013.01); *H04L 41/06* (2013.01); *H04L 41/22* (2013.01); *H04L 43/08* (2013.01);
(Continued)

(58) Field of Classification Search
CPC ....... H04L 43/04; H04L 43/08; H04L 65/403; H04L 65/80; H04L 67/2847; H04L 29/06;
(Continued)

(56) References Cited

U.S. PATENT DOCUMENTS

| 4,460,807 A | 7/1984 | Kerr et al. |
| 4,890,257 A | 12/1989 | Anthias et al. |

(Continued)

FOREIGN PATENT DOCUMENTS

| CN | 101055561 | 10/2007 |
| CN | 101076060 | 11/2007 |

(Continued)

OTHER PUBLICATIONS

Akkaya, Kemal, et al., "A survey on routing protocols for wireless sensor networks" Abtract, 1 page, Ad Hoc Networks, May 2005.
(Continued)

*Primary Examiner* — Binh Kien Tieu
(74) *Attorney, Agent, or Firm* — Polsinelli PC

(57) ABSTRACT

Disclosed is a system, method and computer readable medium enabling collaboration service providers to more accurately predict packet loss, jitter and delay based on current session, historical session and user location parameters. The prediction can be used to forecast the occurrence of poor media quality at the current location and potential future locations.

20 Claims, 15 Drawing Sheets

(51) Int. Cl.
*H04M 3/22* (2006.01)
*H04L 29/06* (2006.01)
*H04L 12/24* (2006.01)
*H04L 29/08* (2006.01)
*H04L 12/911* (2013.01)
*H04M 7/00* (2006.01)
*H04L 12/26* (2006.01)

(52) U.S. Cl.
CPC .......... *H04L 47/82* (2013.01); *H04L 65/1023* (2013.01); *H04L 65/403* (2013.01); *H04L 67/18* (2013.01); *H04L 67/36* (2013.01); *H04M 7/006* (2013.01)

(58) Field of Classification Search
CPC .... H04L 1/0002; H04L 1/0014; H04W 24/02; H04W 36/0083; H04W 4/02; G01C 21/34; G01C 21/3415; G01C 21/3446
USPC .......... 379/1.01, 9, 9.02, 9.04, 15.01, 15.03, 379/15.05, 22, 22.03, 23, 27.01, 28, 379/29.09, 29.1, 32.01, 32.05, 1.04, 32.04
See application file for complete search history.

(56) References Cited

U.S. PATENT DOCUMENTS

| | | |
|---|---|---|
| 4,977,605 A | 12/1990 | Fardeau et al. |
| 5,185,848 A | 2/1993 | Aritsuka et al. |
| 5,293,430 A | 3/1994 | Shiau et al. |
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,970,064 A | 10/1999 | Clark et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,115,393 A | 9/2000 | Engel et al. |
| 6,191,807 B1 | 2/2001 | Hamada et al. |
| 6,298,351 B1 | 10/2001 | Castelli et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,456,624 B1 | 9/2002 | Eccles et al. |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,597,684 B1 | 7/2003 | Gulati et al. |
| 6,646,997 B1 | 11/2003 | Baxley et al. |
| 6,665,396 B1 | 12/2003 | Khouri et al. |
| 6,697,325 B1 | 2/2004 | Cain |
| 6,700,979 B1 | 3/2004 | Washiya |
| 6,711,419 B1 | 3/2004 | Mori |
| 6,721,899 B1 | 4/2004 | Narvaez-Guarnieri et al. |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,894,714 B2 | 5/2005 | Gutta et al. |
| 6,938,208 B2 | 8/2005 | Reichardt |
| 6,954,617 B2 | 10/2005 | daCosta |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,185,077 B1 | 2/2007 | O'Toole et al. |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,453,864 B2 | 11/2008 | Kennedy et al. |
| 7,478,339 B2 | 1/2009 | Pettiross et al. |
| 7,496,650 B1 | 2/2009 | Previdi et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,826,372 B1 | 11/2010 | Mabe et al. |
| 7,826,400 B2 | 11/2010 | Sakauchi |
| 7,830,814 B1 | 11/2010 | Allen et al. |
| 7,840,013 B2 | 11/2010 | Dedieu et al. |
| 7,840,980 B2 | 11/2010 | Gutta |
| 7,848,340 B2 | 12/2010 | Sakauchi et al. |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,063,929 B2 | 11/2011 | Kurtz et al. |
| 8,081,205 B2 | 12/2011 | Baird et al. |
| 8,140,973 B2 | 3/2012 | Sandquist et al. |
| 8,154,583 B2 | 4/2012 | Kurtz et al. |
| 8,169,463 B2 | 5/2012 | Enstad et al. |
| 8,219,624 B2 | 7/2012 | Haynes et al. |
| 8,274,893 B2 | 9/2012 | Bansal |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,385,355 B1 | 2/2013 | Figueira et al. |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,489,765 B2 | 7/2013 | Vasseur et al. |
| 8,520,370 B2 | 8/2013 | Waitzman, III et al. |
| 8,620,840 B2 | 12/2013 | Newnham et al. |
| 8,625,749 B2 | 1/2014 | Jain et al. |
| 8,630,208 B1 | 1/2014 | Kjeldaas |
| 8,630,291 B2 | 1/2014 | Shaffer et al. |
| 8,634,314 B2 | 1/2014 | Banka et al. |
| 8,638,354 B2 | 1/2014 | Leow et al. |
| 8,638,778 B2 | 1/2014 | Lee et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,707,194 B1 | 4/2014 | Jenkins et al. |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,767,716 B2 | 7/2014 | Trabelsi et al. |
| 8,774,164 B2 | 7/2014 | Klein et al. |
| 8,831,505 B1 | 9/2014 | Seshadri |
| 8,842,161 B2 | 9/2014 | Feng et al. |

(56) References Cited

U.S. PATENT DOCUMENTS

| | | |
|---|---|---|
| 8,850,203 B2 | 9/2014 | Sundaram et al. |
| 8,856,584 B2 | 10/2014 | Matsubara |
| 8,860,774 B1 | 10/2014 | Sheeley et al. |
| 8,862,522 B1 | 10/2014 | Jaiswal et al. |
| 8,874,644 B2 | 10/2014 | Allen et al. |
| 8,880,477 B2 | 11/2014 | Barker et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Riskó et al. |
| 8,942,085 B1 | 1/2015 | Pani et al. |
| 8,947,493 B2 | 2/2015 | Lian et al. |
| 8,948,054 B2 | 2/2015 | Kreeger et al. |
| 8,972,494 B2 | 3/2015 | Chen et al. |
| 8,982,707 B2 | 3/2015 | Moreno et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,119 B2 | 9/2015 | Yang et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,553 B2 | 11/2015 | Jain et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |
| 9,268,398 B2 | 2/2016 | Tipirneni |
| 9,298,342 B2 | 3/2016 | Zhang et al. |
| 9,323,417 B2 | 4/2016 | Sun et al. |
| 9,324,022 B2 | 4/2016 | Williams, Jr. et al. |
| 9,335,892 B2 | 5/2016 | Ubillos |
| 9,338,065 B2 | 5/2016 | Vasseur et al. |
| 9,338,084 B2 | 5/2016 | Badoni |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,374,294 B1 | 6/2016 | Pani |
| 9,407,621 B2 | 8/2016 | Vakil et al. |
| 9,419,811 B2 | 8/2016 | Dong et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,544,224 B2 | 1/2017 | Chu et al. |
| 9,553,799 B2 | 1/2017 | Tarricone |
| 9,558,451 B2 | 1/2017 | Nilsson et al. |
| 9,563,480 B2 | 2/2017 | Messerli et al. |
| 9,596,099 B2 | 3/2017 | Yang et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,654,385 B2 | 5/2017 | Chu et al. |
| 9,667,799 B2 | 5/2017 | Olivier et al. |
| 9,674,625 B2 | 6/2017 | Armstrong-Muntner |
| 9,762,709 B1 | 9/2017 | Snyder et al. |
| 2001/0030661 A1 | 10/2001 | Reichardt |
| 2002/0018051 A1 | 2/2002 | Singh |
| 2002/0061001 A1 | 5/2002 | Garcia-Luna-Aceves et al. |
| 2002/0076003 A1 | 6/2002 | Zellner et al. |
| 2002/0078153 A1 | 6/2002 | Chung et al. |
| 2002/0101505 A1 | 8/2002 | Gutta et al. |
| 2002/0105904 A1 | 8/2002 | Hauser et al. |
| 2002/0116154 A1 | 8/2002 | Nowak et al. |
| 2002/0140736 A1 | 10/2002 | Chen |
| 2002/0159386 A1 | 10/2002 | Grosdidier et al. |
| 2002/0188522 A1 | 12/2002 | McCall et al. |
| 2003/0005149 A1 | 1/2003 | Haas et al. |
| 2003/0028647 A1 | 2/2003 | Grosu |
| 2003/0046421 A1 | 3/2003 | Horvitz et al. |
| 2003/0061340 A1 | 3/2003 | Sun et al. |
| 2003/0067912 A1 | 4/2003 | Mead et al. |
| 2003/0068087 A1 | 4/2003 | Wu et al. |
| 2003/0091052 A1 | 5/2003 | Pate et al. |
| 2003/0117992 A1 | 6/2003 | Kim et al. |
| 2003/0133417 A1 | 7/2003 | Badt, Jr. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0225549 A1 | 12/2003 | Shay et al. |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0153563 A1 | 8/2004 | Shay et al. |
| 2004/0210637 A1 | 10/2004 | Loveland |
| 2004/0218525 A1 | 11/2004 | Elie-Dit-Cosaque et al. |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0111487 A1 | 5/2005 | Matta et al. |
| 2005/0114532 A1 | 5/2005 | Chess et al. |
| 2005/0131774 A1 | 6/2005 | Huxter |
| 2005/0143979 A1 | 6/2005 | Lee et al. |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0072471 A1 | 4/2006 | Shiozawa |
| 2006/0083193 A1 | 4/2006 | Womack et al. |
| 2006/0083305 A1 | 4/2006 | Dougherty et al. |
| 2006/0084471 A1 | 4/2006 | Walter |
| 2006/0116146 A1 | 6/2006 | Herrod et al. |
| 2006/0133404 A1 | 6/2006 | Zuniga et al. |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2006/0274647 A1 | 12/2006 | Wang et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0071030 A1 | 3/2007 | Lee |
| 2007/0083650 A1 | 4/2007 | Collomb et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0120966 A1 | 5/2007 | Murai |
| 2007/0139626 A1 | 6/2007 | Saleh et al. |
| 2007/0149249 A1 | 6/2007 | Chen et al. |
| 2007/0150453 A1 | 6/2007 | Morita |
| 2007/0168444 A1 | 7/2007 | Chen et al. |
| 2007/0192065 A1 | 8/2007 | Riggs et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |

(56) References Cited

U.S. PATENT DOCUMENTS

| | | |
|---|---|---|
| 2007/0250567 A1 | 10/2007 | Graham et al. |
| 2008/0049622 A1 | 2/2008 | Previdi et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0089246 A1 | 4/2008 | Ghanwani et al. |
| 2008/0107255 A1 | 5/2008 | Geva et al. |
| 2008/0133663 A1 | 6/2008 | Lentz |
| 2008/0140817 A1 | 6/2008 | Agarwal et al. |
| 2008/0154863 A1 | 6/2008 | Goldstein |
| 2008/0159151 A1 | 7/2008 | Datz et al. |
| 2008/0181259 A1 | 7/2008 | Andreev et al. |
| 2008/0192651 A1 | 8/2008 | Gibbings |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2008/0293353 A1 | 11/2008 | Mody et al. |
| 2009/0003232 A1 | 1/2009 | Vaswani et al. |
| 2009/0010264 A1 | 1/2009 | Zhang |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0073988 A1 | 3/2009 | Ghodrat et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0129316 A1 | 5/2009 | Ramanathan et al. |
| 2009/0132949 A1 | 5/2009 | Bosarge |
| 2009/0147714 A1 | 6/2009 | Jain et al. |
| 2009/0147737 A1 | 6/2009 | Tacconi et al. |
| 2009/0168653 A1 | 7/2009 | St. Pierre et al. |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0271467 A1 | 10/2009 | Boers et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0303908 A1 | 12/2009 | Deb et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0046504 A1 | 2/2010 | Hill |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0165863 A1 | 7/2010 | Nakata |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0082596 A1 | 4/2011 | Meagher et al. |
| 2011/0087745 A1 | 4/2011 | O'Sullivan et al. |
| 2011/0116389 A1 | 5/2011 | Tao et al. |
| 2011/0117535 A1 | 5/2011 | Benko et al. |
| 2011/0131498 A1 | 6/2011 | Chao et al. |
| 2011/0149759 A1 | 6/2011 | Jollota |
| 2011/0154427 A1 | 6/2011 | Wei |
| 2011/0228696 A1 | 9/2011 | Agarwal et al. |
| 2011/0230209 A1 | 9/2011 | Kilian |
| 2011/0255570 A1 | 10/2011 | Fujiwara |
| 2011/0264928 A1 | 10/2011 | Hinckley |
| 2011/0267962 A1 | 11/2011 | J S A et al. |
| 2011/0270609 A1 | 11/2011 | Jones et al. |
| 2011/0271211 A1 | 11/2011 | Jones et al. |
| 2011/0274283 A1 | 11/2011 | Athanas |
| 2011/0283226 A1 | 11/2011 | Basson et al. |
| 2011/0314139 A1 | 12/2011 | Song et al. |
| 2012/0009890 A1* | 1/2012 | Curcio ............ H04L 29/06 455/230 |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0075999 A1 | 3/2012 | Ko et al. |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0163177 A1 | 6/2012 | Vaswani et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |
| 2012/0213062 A1 | 8/2012 | Liang et al. |
| 2012/0213124 A1 | 8/2012 | Vasseur et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0307629 A1 | 12/2012 | Vasseur et al. |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |
| 2013/0003542 A1 | 1/2013 | Catovic et al. |
| 2013/0010610 A1 | 1/2013 | Karthikeyan et al. |
| 2013/0027425 A1 | 1/2013 | Yuan |
| 2013/0028073 A1 | 1/2013 | Tatipamula et al. |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0070755 A1 | 3/2013 | Trabelsi et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0128720 A1 | 5/2013 | Kim et al. |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0177305 A1 | 7/2013 | Prakash et al. |

(56) References Cited

U.S. PATENT DOCUMENTS

| | | |
|---|---|---|
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0250754 A1 | 9/2013 | Vasseur et al. |
| 2013/0252669 A1 | 9/2013 | Nhiayi |
| 2013/0263020 A1 | 10/2013 | Heiferman et al. |
| 2013/0275589 A1 | 10/2013 | Karthikeyan et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0311673 A1 | 11/2013 | Karthikeyan et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0049595 A1 | 2/2014 | Feng et al. |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1 | 4/2014 | Anderson et al. |
| 2014/0126423 A1 | 5/2014 | Vasseur et al. |
| 2014/0133327 A1 | 5/2014 | Miyauchi |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0204759 A1 | 7/2014 | Guo et al. |
| 2014/0207945 A1 | 7/2014 | Galloway et al. |
| 2014/0215077 A1 | 7/2014 | Soudan et al. |
| 2014/0219103 A1 | 8/2014 | Vasseur et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0293955 A1 | 10/2014 | Keerthi |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0351327 A1 | 11/2014 | Huang et al. |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0023174 A1 | 1/2015 | Dasgupta et al. |
| 2015/0029301 A1 | 1/2015 | Nakatomi et al. |
| 2015/0052095 A1 | 2/2015 | Yang et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0113369 A1 | 4/2015 | Chan et al. |
| 2015/0128068 A1 | 5/2015 | Kim |
| 2015/0142702 A1 | 5/2015 | Nilsson et al. |
| 2015/0172120 A1 | 6/2015 | Dwarampudi et al. |
| 2015/0178626 A1 | 6/2015 | Pielot et al. |
| 2015/0215365 A1* | 7/2015 | Shaffer .............. H04L 65/80 370/252 |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0324689 A1 | 11/2015 | Wierzynski et al. |
| 2015/0350126 A1 | 12/2015 | Xue |
| 2015/0358248 A1 | 12/2015 | Saha et al. |
| 2015/0373063 A1 | 12/2015 | Vashishtha et al. |
| 2015/0373414 A1 | 12/2015 | Kinoshita |
| 2016/0037304 A1* | 2/2016 | Dunkin .............. H04L 67/2847 455/456.1 |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0182580 A1 | 6/2016 | Nayak |
| 2016/0203404 A1 | 7/2016 | Cherkasova et al. |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2016/0315802 A1 | 10/2016 | Wei et al. |
| 2016/0321347 A1 | 11/2016 | Zhou et al. |
| 2016/0335111 A1 | 11/2016 | Bruun et al. |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0093874 A1 | 3/2017 | Uthe |
| 2017/0104961 A1 | 4/2017 | Pan et al. |
| 2017/0111233 A1* | 4/2017 | Kokkula ............. H04L 41/145 |
| 2017/0150399 A1 | 5/2017 | Kedalagudde et al. |
| 2017/0171260 A1 | 6/2017 | Jerrard-Dunne et al. |
| 2017/0228251 A1 | 8/2017 | Yang et al. |
| 2017/0289033 A1 | 10/2017 | Singh et al. |
| 2017/0324850 A1 | 11/2017 | Snyder et al. |
| 2017/0347308 A1 | 11/2017 | Chou et al. |
| 2017/0353361 A1 | 12/2017 | Chopra et al. |
| 2018/0013656 A1 | 1/2018 | Chen |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 102004671 | 3/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| EP | 2341686 | 8/2016 |
| WO | WO 98/55903 | 12/1998 |
| WO | WO 2008/139269 | 11/2008 |

(56) References Cited

FOREIGN PATENT DOCUMENTS

| WO | WO 2012/167262 | 12/2012 |
|----|----|----|
| WO | WO 2014/118736 | 8/2014 |

OTHER PUBLICATIONS

Alsheikh, Mohammad Abu, et al., "Machine Learning in Wireless Sensor Networks: Algorithms, Strategies, and Applications," Mar. 19, 2015, 23 pages.

Author Unknown, "White Paper on Service Enabler Virtualization," Draft dated Nov. 9, 2015, 26 pages, Open Mobile Alliance (OMA), San Diego, CA, USA.

Baccour, Nouha, et al., "Radio Link Quality Estimation in Wireless Sensor Networks: A Survey," 2011, 35 pages.

Fan, Na, "Learning Nonlinear Distance Functions Using Neural Network for Regression with Application to Robust Human Age Estimation," Abstract, 1 page, IEEE International Conference on Computer Vision (ICCV), Nov. 2011, Institute of Electrical and Electronics Engineers, Barcelona, Spain.

Flushing, Eduardo Feo, et al.: "A mobility-assisted protocol for supervised learning of link quality estimates in wireless networks," Feb. 2012, 8 pages.

Fortunato, Santo, "Community Detection in Graphs", arXiv:0906.0612v2 [physics.soc-ph]; Physics Reports 486, 75-174, Jan. 25, 2010, 103 pages.

Godsill, Simon, et al., "Detection and suppression of keyboard transient noise in audio streams with auxiliary keybed microphone," Abstract, 1 page, 2015 IEEE International Speech and Signal Processing (ICASSP), Apr. 19-24, 2015, Brisbane, QLD, Australia (Abstract available at http://ieeexplore.ieee.org/document/7177995/, downloaded on Feb. 28, 2018.

Hershey, Shawn, et al., "CNN Architectures for Large-Scale Audio Classification," Jan. 10, 2017, 5 pages, Google, Inc., New York, NY, and Mountain View, CA, USA.

Hradis, Michael, et al., "Voice activity detection from gaze in video mediated communication," ACM, Mar. 28-30, 2012 http://medusa.fit.vutbr.cz/TA2/TA2 . . . 4 pages.

Hui, J., et al., "An IPv6 Routing Header for Source Routes with the Routing Protocol for Low-Power and Lossy Networks (RPL)", Request for Comments 6554, Mar. 2012, 12 pages, Internet Engineering Task Force Trust.

Kuklinski, Slawomir, et al., "Design Principles of Generalized Network Orchestrators," 2016 IEEE International Conference on Communications Workshops (ICC), May 23, 2016, pp. 430-435.

Liu, Tao, et al., "Data-driven Link Quality Prediction Using Link Features," ACM Transactions on Sensor Networks, Feb. 2014, 35 pages.

McKenna, Shannon, et al., "Acoustic Event Detection Using Machine Learning: Identifying Train Events," Sep. 2017, pp. 1-5, http://cs229.stanford.edu/proj2012/McKennaMcLaren-AcousticEventDetectionUsingMachineLearningIdentifyingTrainEvents.pdf, downloaded on Feb. 28, 2018.

Newman, M. E. J., "Analysis of weighted networks," Phys. Rev. E 70, 056131, Jul. 20, 2004, 9 pages, http://arxiv.org/pdf/condmal/0407503.pdf.

Newman, W. E. J., "Modularity and Community Structure in Networks", Proceedings of the National Academy of Sciences of the United States of America, Jun. 2006, vol. 103, No. 23, pp. 8577-8582, PNAS, Washington, DC.

Piczak, Karol J., "Environmental Sound Classification With Convolutional Neutral Networks," 2015 IEEE International Workshop on Machine Learning for Signal Processing, Sep. 17-20, 2015, Boston, USA.

Raghavendra, Kulkami V., et al., "Computational Intelligence in Wireless Sensor Networks: A Survey," Abstract, 1 page, IEEE Communications Surveys & Tutorials, May 27, 2010.

Salamon, Justin, et al., "Deep Convolutional Neutral Networks and Data Augmentation for Environmental Sound Classification," IEEE Signal Processing Letters, Accepted Nov. 2016, 5 pages.

Siddiky, Feroz Ahmed, et al., "An Efficient Approach to Rotation Invariant Face Detection Using PCA, Generalized Regression Neural Network and Mahalanobis Distance by Reducing Search Space," Abstract, 1 page, 10th International Conference on Computer and Information Technology, Dec. 2007, Dhaka, Bangladesh.

Singh, Shio Kumar, et al., "Routing Protocols in Wireless Sensor Networks—A Survey," International Journal of Computer Science & Engineering Survey (IJCSES) vol. 1, No. 2, Nov. 2010, pp. 63-83.

Tang, Pengcheng, et al., "Efficient Auto-scaling Approach in the Telco Cloud using Self-learning Algorithm," 2015 IEEE Global Communications Conference (Globecom), Dec. 6, 2015, pp. 1-6.

Tang, Yongning, et al., "Automatic belief network modeling via policy interference for SDN fault localization," Journal of Internet Services and Applications, Jan. 20, 2016, pp. 1-13, Biomed Central Ltd., London, UK.

Ting, Jo-Anne, et al., "Variational Bayesian Least Squares: An Application to Brain-Machine Interface Data," Neural Networks, vol. 21, Issue 8, Oct. 2008, pp. 1112-1131, Elsevier.

Tsang, Yolanda, et al., "Network Radar: Tomography from Round Trip Time Measurements," ICM'04, Oct. 25-27, 2004, Sicily, Italy.

Vasseur, JP., et al., "Routing Metrics Used for Path Calculation in Low-Power and Lossy Networks," Request for Comments 6551, Mar. 2012, 30 pages, Internet Engineering Task Force Trust.

Winter, T., et al., "RPL: IPv6 Routing Protocol for Low-Power and Lossy Networks," Request for Comments 6550, Mar. 2012, 157 pages, Internet Engineering Task Force Trust.

Zhang, Xiaoju, et al., "Dilated convolution neutral network with LeakyReLU for environmental sound classification," Abstract, 1 page, 2017 22$^{nd}$ International Conference on Digital Signal Processing (DSP), Aug. 23-25, 2017, London, U.K.

Zinkevich, Martin, et al. "Parallelized Stochastic Gradient Descent," 2010, 37 pages.

Author Unknown, "A Primer on the H.323 Series Standard," Version 2.0, available at http://www.packetizer.com/voip/h323/papers/primer/, retrieved on Dec. 20, 2006, 17 pages.

Author Unknown, ""I can see the future" 10 predictions concerning cell-phones," Surveillance Camera Players, http://www.notbored.org/cell-phones.html, Jun. 21, 2003, 2 pages.

Author Unknown, "Active screen follows mouse and dual monitors," KDE Community Forums, Apr. 13, 2010, 3 pages.

Author Unknown, "Implementing Media Gateway Control Protocols" A RADVision White Paper, Jan. 27, 2002, 16 pages.

Author Unknown, "Manage Meeting Rooms in Real Time," Jan. 23, 2017, door-tablet.com, 7 pages.

Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).

Cisco Systems, Inc., "Cisco WebEx Meetings Server System Requirements release 1.5." 30 pages, Aug. 14, 2013.

Cisco White Paper, "Web Conferencing: Unleash the Power of Secure, Real-Time Collaboration," pp. 1-8, 2014.

Clarke, Brant, "Polycom Announces RealPresence Group Series" "Polycom Announces RealPresence Group Series" dated Oct. 8, 2012 available at http://www.323.tv/news/polycom-realpresence-group-series (last accessed Oct. 11, 2013).

Clauser, Grant, et al., "Is the Google Home the voice-controlled speaker for you?," The Wire Cutter, Nov. 22, 2016, pp. 1-15.

Cole, Camille, et al., "Videoconferencing for K-12 Classrooms," Second Edition (excerpt) http://www.iste.org/docs/excerpts/VIDCO2-excerpt.pdf (last accessed 1011-2013), 2009.

Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed 10-112013).

Infocus, "Mondopad," Mondopad. http://www.infocus.com/sites/default/files/InFocus-Mondopad-INF5520a-INF7021-Datasheet-EN.pdf (last accessed Oct. 11, 2013), 2013.

MacCormick, John, "Video Chat with Multiple Cameras," CSCW '13, Proceedings of the 2013 conference on Computer supported cooperative work companion, pp. 195-198, ACM, New York, NY, USA, 2013.

(56) References Cited

OTHER PUBLICATIONS

Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900660 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.
Polycom, "Polycom UC Board, Transforming ordinary surfaces into virtual whiteboards" 2012, Polycom, Inc., San Jose, CA, http://www.uatg.com/pdf/polycom/poycom-uc-board-_datasheet.pdf, (last accessed Oct. 11, 2013).
Stevenson, Nancy, "Webex Web Meetings for Dummies" 2005, Wiley Publishing Inc., Indianapolis, Indiana, USA, 339 pages.
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
TNO, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—http://www.vidyo.com/products/vidyopanorama/ dated 2013 (last accessed Oct. 11, 2013).
Choi, Jae Young, et al; "Towards an Automatic Face Indexing System for Actor-based Video Services in an IPTV Environment," IEEE Transactions on 56, No. 1 (2010): 147-155.
Cisco Systems, Inc. "Cisco webex: WebEx Meeting Center User Guide For Hosts, Presenters, and Participants" © 1997-2013, pp. 1-394 plus table of contents.
Cisco Systems, Inc., "Cisco Webex Meetings for iPad and iPhone Release Notes," Version 5.0, Oct. 2013, 5 pages.
Cisco Systems, Inc., "Cisco Unified Personal Communicator 8.5", 2011, 9 pages.
Cisco Systems, Inc., "VXLAN Network with MP-BGP EVPN Control Plane Design Guide," Mar. 21, 2016, 44 pages.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Grothaus, Michael, "How Interactive Product Placements Could Save Television," Jul. 25, 2013, 4 pages.
Hannigan, Nancy Kruse, et al., The IBM Lotus Samteime VB Family Extending the IBM Unified Communications and Collaboration Strategy (2007), available at http://www.ibm.com/developerworks/lotus/library/sametime8-new/, 10 pages.
Hirschmann, Kenny, "TWIDDLA: Smarter Than The Average Whiteboard," Apr. 17, 2014, 2 pages.
Nyamgondalu, Nagendra, "Lotus Notes Calendar And Scheduling Explained!" IBM, Oct. 18, 2004, 10 pages.
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee is Driving", May 20, 2013, 13 pages.

\* cited by examiner

| Geolocation | Meeting time and duration | Day of week | Device Type | Connectivity Type | Media Gateway | User Rating |
|---|---|---|---|---|---|---|
| RTP Building-A | 9:00 - 9:45 EST | Monday | Desktop | Ethernet | Media-Gateway-1 | 5 |
| RTP Building-A | 9:00 - 9:45 EST | Tuesday | Desktop | Ethernet | Media-Gateway-1 | 3 |
| RTP Building-A | 9:00 - 9:45 EST | Wednesday | Desktop | Ethernet | Media-Gateway-1 | 3 |
| RTP Building-A | 9:00 - 9:45 EST | Thursday | Desktop | Ethernet | Media-Gateway-1 | 5 |
| RTP Building-A | 9:00 - 9:45 EST | Friday | Desktop | Ethernet | Media-Gateway-1 | 5 |
| RTP Building-A | 9:00 - 9:45 EST | Monday | Desktop | Ethernet | Media-Gateway-1 | 5 |
| RTP Building-A | 9:00 - 9:45 EST | Tuesday | Desktop | Ethernet | Media-Gateway-1 | 3 |
| RTP Building-A | 9:00 - 9:45 EST | Wednesday | Desktop | Ethernet | Media-Gateway-1 | 3 |
| RTP Building-A | 9:00 - 9:45 EST | Thursday | Desktop | Ethernet | Media-Gateway-1 | 5 |
| RTP Building-A | 9:00 - 9:45 EST | Friday | Desktop | Ethernet | Media-Gateway-1 | 5 |
| RTP Building-A | 9:00 - 9:45 EST | Monday | Desktop | Ethernet | Media-Gateway-1 | 5 |
| RTP Building-A | 9:00 - 9:45 EST | Tuesday | Desktop | Ethernet | Media-Gateway-2 | 3 |
| RTP Building-A | 9:00 - 9:45 EST | Wednesday | Desktop | Ethernet | Media-Gateway-2 | 5 |
| RTP Building-A | 9:00 - 9:45 EST | Thursday | Desktop | Ethernet | Media-Gateway-1 | 5 |
| RTP Building-A | 9:00 - 9:45 EST | Friday | Desktop | Ethernet | Media-Gateway-1 | 5 |
| RTP Building-A | 9:00 - 9:45 EST | Monday | Desktop | Ethernet | Media-Gateway-1 | 5 |
| RTP Building-A | 9:00 - 9:45 EST | Tuesday | Desktop | Ethernet | Media-Gateway-2 | 5 |
| RTP Building-A | 9:00 - 9:45 EST | Wednesday | Desktop | Ethernet | Media-Gateway-1 | 3 |
| RTP Building-A | 9:00 - 9:45 EST | Thursday | Desktop | Ethernet | Media-Gateway-1 | 5 |
| RTP Building-A | 9:00 - 9:45 EST | Friday | Desktop | Ethernet | Media-Gateway-1 | 5 |
| RTP Building-A | 9:00 - 9:45 EST | Monday | Desktop | Ethernet | Media-Gateway-1 | 5 |
| RTP Building-A | 9:00 - 9:45 EST | Tuesday | Desktop | Ethernet | Media-Gateway-3 | 4 |
| RTP Building-A | 9:00 - 9:45 EST | Wednesday | Desktop | Ethernet | Media-Gateway-1 | 3 |
| RTP Building-A | 9:00 - 9:45 EST | Thursday | Desktop | Ethernet | Media-Gateway-1 | 5 |
| RTP Building-A | 9:00 - 9:45 EST | Friday | Desktop | Ethernet | Media-Gateway-1 | 5 |
| RTP Building-A | 9:00 - 9:45 EST | Monday | Desktop | Ethernet | Media-Gateway-1 | 5 |
| RTP Building-A | 9:00 - 9:45 EST | Tuesday | Desktop | Ethernet | Media-Gateway-1 | 3 |
| RTP Building-A | 9:00 - 9:45 EST | Wednesday | Desktop | Ethernet | Media-Gateway-2 | 5 |
| RTP Building-A | 9:00 - 9:45 EST | Thursday | Desktop | Ethernet | Media-Gateway-1 | 5 |
| RTP Building-A | 9:00 - 9:45 EST | Friday | Desktop | Ethernet | Media-Gateway-1 | 5 |

Example of an extended SDP

```
v=0
o=eric 2890844526 2890842807 IN IP4 10.47.16.5
s=sync-up
i=regular 1:1 sync-up
e=erichen3@cisco.com (Eric Chen)
c=IN IP4 224.2.17.12/127
t=2873397496 2873404696
a=recvonly
m=audio 49170 RTP/AVP 0
m=video 51372 RTP/AVP 99
a=rtpmap:99 h263-1998/90000
b=1324
a=bandwidth_variance:523
a=rtt:213
a=net:wifi
a=ua:ios
a=wme:3.2
a=hw:iPhone6;2
a=...
```

Parameters utilized to construct feature vectors for machine learning

| Geolocation | Date | Meeting Time and During | Day of week | Device Type | Connectivity Type | Host Cluster | {Packet loss, Jitter, Delay} = Poor |
|---|---|---|---|---|---|---|---|
| ALT1 | Jan. 9, 2017 | 9:00 - 9:45 EST | Monday | Mobile | LTE, Carrier 1 | Cluster-1 | {1%, 1ms, 50ms} = N |
| ALT1 | Jan. 9, 2017 | 9:03 - 9:45 EST | Monday | Mobile | LTE, Carrier 1 | Cluster-1 | {1%, 1ms, 50ms} = N |
| M2 | Jan. 9, 2017 | 9:15 - 9:45 EST | Monday | Mobile | LTE, Carrier 1 | Cluster-1 | {10%, 1ms, 50ms} = Y |
| M1 | Jan. 9, 2017 | 9:00 - 9:50 EST | Monday | Mobile | LTE, Carrier 1 | Cluster-1 | {1%, 1ms, 50ms} = N |
| M1 | Jan. 9, 2017 | 9:07 - 9:45 EST | Monday | Mobile | LTE, Carrier 1 | Cluster-1 | {0%, 1ms, 50ms} = N |
| ALT1 | Jan. 10, 2017 | 8:58 - 9:42 EST | Tuesday | Mobile | LTE, Carrier 1 | Cluster-1 | {1%, 1ms, 50ms} = N |
| ALT1 | Jan. 10, 2017 | 9:03 - 9:45 EST | Tuesday | Mobile | LTE, Carrier 1 | Cluster-1 | {1%, 1ms, 50ms} = N |
| M2 | Jan. 10, 2017 | 9:00 - 9:48 EST | Tuesday | Mobile | LTE, Carrier 1 | Cluster-1 | {9%, 2ms, 50ms} = Y |
| M1 | Jan. 10, 2017 | 9:00 - 9:48 EST | Tuesday | Mobile | LTE, Carrier 1 | Cluster-1 | {1%, 1ms, 50ms} = N |
| M1 | Jan. 10, 2017 | 9:03 - 9:49 EST | Tuesday | Mobile | LTE, Carrier 1 | Cluster-2 | {0%, 1ms, 50ms} = N |
| ALT1 | Jan. 11, 2017 | 9:00 - 9:45 EST | Wednesday | Mobile | LTE, Carrier 1 | Cluster-1 | {1%, 1ms, 50ms} = N |
| ALT1 | Jan. 11, 2017 | 9:00 - 9:43 EST | Wednesday | Mobile | LTE, Carrier 1 | Cluster-1 | {1%, 1ms, 50ms} = N |
| M2 | Jan. 11, 2017 | 9:00 - 9:45 EST | Wednesday | Mobile | LTE, Carrier 1 | Cluster-1 | {15%, 1ms, 50ms} = Y |
| M1 | Jan. 11, 2017 | 9:08 - 9:51 EST | Wednesday | Mobile | 4G, Carrier 1 | Cluster-1 | {1%, 1ms, 50ms} = N |
| ALT3 | Jan. 12, 2017 | 9:00 - 9:45 EST | Wednesday | Desktop | Ethernet | Cluster-1 | {0%, 1ms, 50ms} = N |
| ALT1 | Jan. 12, 2017 | 9:03 - 9:43 EST | Thursday | Mobile | LTE, Carrier 1 | Cluster-2 | {1%, 1ms, 50ms} = N |
| ALT1 | Jan. 12, 2017 | 9:00 - 9:48 EST | Thursday | Mobile | LTE, Carrier 1 | Cluster-1 | {1%, 1ms, 50ms} = N |
| M2 | Jan. 12, 2017 | 9:00 - 9:50 EST | Thursday | Mobile | LTE, Carrier 1 | Cluster-2 | {15%, 1ms, 50ms} = Y |
| ALT1 | Jan. 12, 2017 | 9:03 - 9:43 EST | Thursday | Mobile | LTE, Carrier 1 | Cluster-1 | {1%, 1ms, 50ms} = N |
| M2 | Jan. 12, 2017 | 9:03 - 9:51 EST | Thursday | Mobile | 4G, Carrier 1 | Cluster-1 | {1%, 1ms, 50ms} = N |
| M2 | Jan. 12, 2017 | 9:00 - 9:25 EST | Thursday | Desktop | Ethernet | Cluster-1 | {0%, 1ms, 50ms} = N |

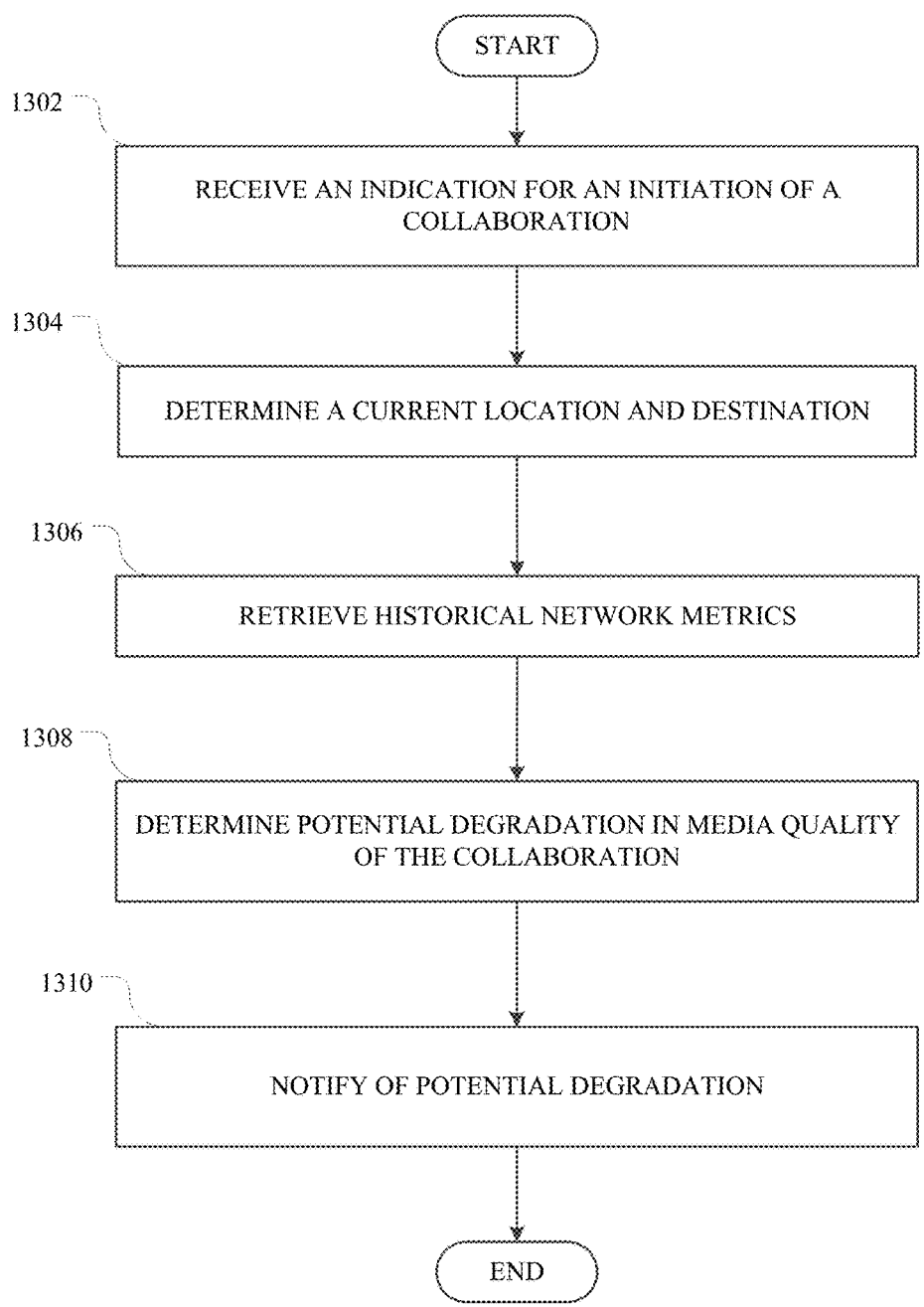

MEDIA QUALITY PREDICTION FOR COLLABORATION SERVICES

CROSS REFERENCE TO RELATED APPLICATIONS

This application is a Continuation of U.S. application Ser. No. 15/659,356, entitled PREDICTIVE MODEL FOR VOICE/VIDEO OVER IP CALLS, filed Jul. 25, 2017, the contents of which are incorporated by reference in its entirety.

TECHNICAL FIELD

The present technology pertains to media resources and communications, and more particularly pertains to selecting a media resource or communication path based on a quality prediction.

The present technology pertains to voice/video over IP calls, and more particularly pertains to predicting quality of a voice/video over IP call before initiated.

The present technology pertains to collaboration services, and more particularly pertains to prediction of media quality along a route during collaboration services.

BACKGROUND

Conventionally, a media gateway is chosen either based on its location, the location of a requesting client, or both. Media gateways may also be chosen through load-balancing based on the current workload that is distributed over alternative gateways. The former approach overlooks the fact that physical distance does not always correlate to network performance. The latter approach fails to address the varying patterns and requirements of multiple media streams involved in, for example, a web conference call. For example, audio traffic can be smooth while video traffic can have numerous spikes, and audio traffic may be more delay-sensitive than video traffic. Additionally, user preferences, device type, and communication style may result in different network requirements and priorities on a user-by-user basis.

Accordingly, both conventional approaches can lead to sub-par performance in a variety of situations, and as such, it would be desirable to provide an improved ability to perform resource selection.

Although there has been much improvement to the quality of Voice over IP (VoIP), the quality can still fluctuate significantly due to the dynamic nature of underlying networks and can be affected by various factors such as jitter, latency and bandwidth. There is a definite need to mitigate the occurrence of media quality issues to deliver a good collaboration experience to end users.

Subscription-based Cloud Collaboration Services have made consuming services more cost efficient for Enterprises and Collaboration Service Providers. Subscription-based Cloud Collaboration Services generally operate with a "best effort" routing through communication networks (e.g., the Internet). Accordingly, traversing a network using "best effort" removes the Enterprises and Collaboration Service Providers ability to control the end-user media experience.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example input data set that can be employed by aspects of the present disclosure;

FIG. 9 illustrates an example of an extended session description protocol message format and fields;

FIG. 12 illustrates an example historical data set used to predict quality of a collaboration based on future geolocation;

FIG. 13 illustrates an example method for predicting media quality;

DESCRIPTION OF EXAMPLE EMBODIMENTS

Figure 1:
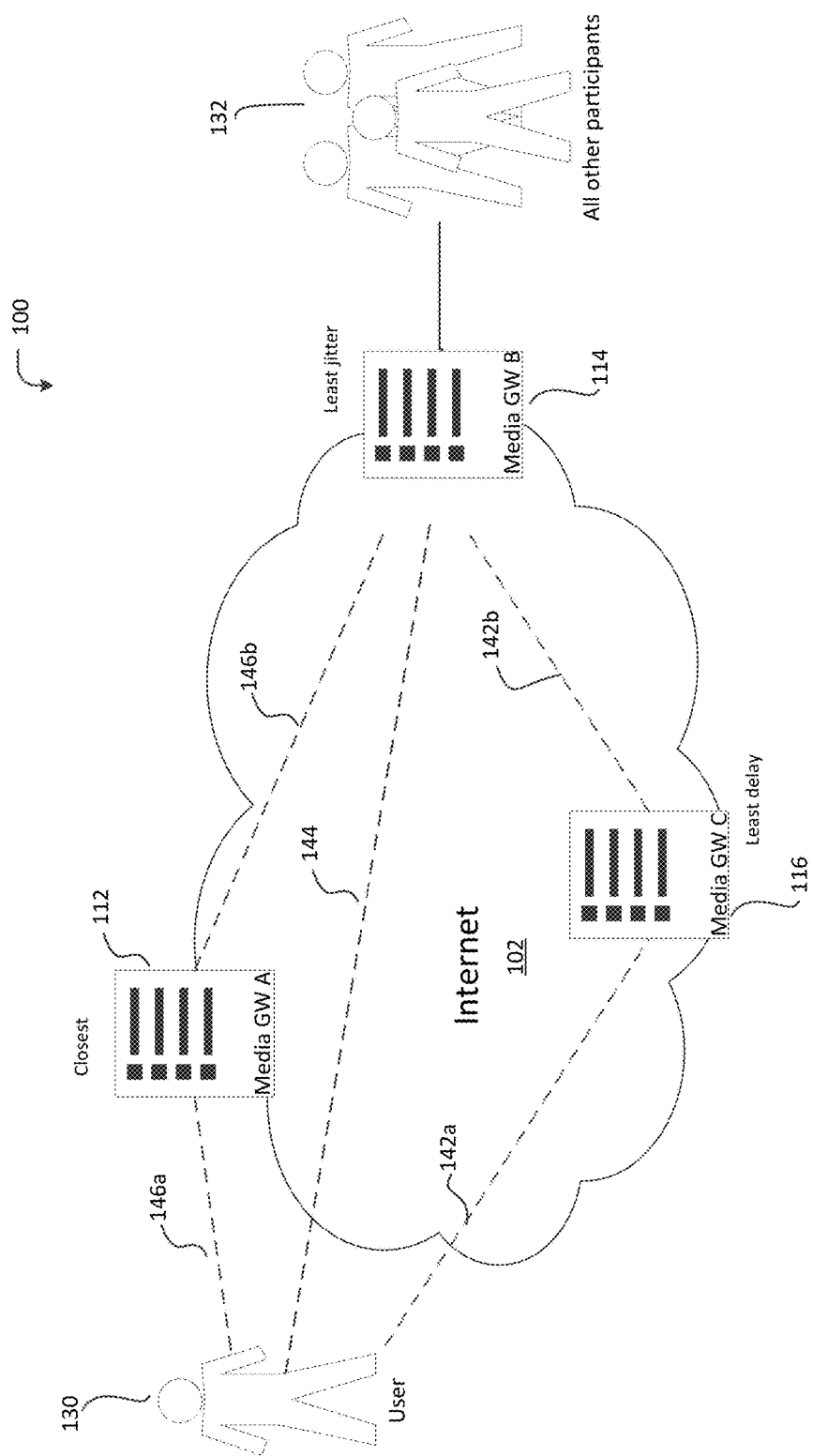
FIG. 1 illustrates an example environment in which aspects of the present disclosure can operate.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The connection quality offered by a media gateway often fluctuates, and can be difficult to predict, or even account for, when making a selection of a media gateway to handle a connection request. Accordingly, the approaches herein are provided to address these issues, by providing a two-step modeling process that can predict both quality metrics for a given gateway, as well as predicting an associated user rating corresponding to the quality metrics. In this manner, all available gateways can be analyzed and ranked, such that an incoming connection request is routed to the gateway that is predicted to have the highest user rating.

The quality of calls, such as Voice over IP (VoIP) calls, can fluctuate significantly due to the dynamic nature of networks, and can be affected by various factors such as jitter, latency, and bandwidth, for example. The approaches herein can address call quality issues, including voice/video quality, by forecasting the expected voice/video quality, identifying factors affecting the call quality, and taking proactive actions to improve the call experience. For example, the expected voice/video quality of a call can be forecasted by performing an automated and silent practice, background, or "dry" run and applying predictive models on telemetrics collected from this run. The approaches herein can predict how a user may rate the call experience, and identify the contributing factors. These factors can be used to take proactive action to improve the call experience and make the related information available through the application in the event that UE (User Equipment) designers wish to display call experience reason information to the user.

Disclosed is a system, method and computer readable medium for forecasting an expected quality of a call. In some examples, a system or method can generate a plurality of scenarios from a plurality of network metrics, retrieve historical ratings for the plurality of network metrics from a plurality of users, and assign the historical ratings for the plurality of network metrics to the plurality of scenarios. The system, method and computer readable medium can filter one or more of the plurality of users based on similarities of the historical ratings for the plurality of scenarios with one or more current network metrics, and forecast an expected call quality based on the historical ratings of the one or more filtered users.

Disclosed is an improved system, method and computer readable medium enabling collaboration service providers to more accurately predict packet loss, jitter and delay based on current session, historical session and user location parameters. The prediction can be used to forecast the occurrence of poor media quality at the current location and potential future locations.

Also disclosed is a system, method and computer readable medium for predicting media quality. The system, method and computer readable medium can receive an indication for an initiation of a collaborative virtual meeting, determine a current location and destination of a client device, retrieving historical network metrics data (e.g., location, destination, day of the week, device type, meeting time, connectivity type, and host cluster) and real-time network metrics data (e.g., day of the week, device type, current time, connectivity type, and host cluster), determine possible degradation in media quality of the collaborative virtual meeting for the current location and the destination based on the historical network metrics data and the real-time metrics data and notify the client device of the possible degradation (e.g., the notification can be displayed on the user device a map illustrating the current location and destination and can also display alerts on the map corresponding to the notifications of possible degradation). In other examples, the notification can display one or more routes from the current location to the destination, display the alerts along the routes; and highlight the route with least degradation.

In some examples, the system, method and computer readable medium can determine possible degradation along one or more routes between the current location and the destination and notify the client device on possible degradation along the one or more routes. In some examples, the system, method and computer readable medium can provide a recommended route with the least possible degradation.

DESCRIPTION

Disclosed is a system and method for selection of a media gateway based on the suggested (or required) criteria. While the end-to-end quality of cloud-based web conferencing cannot be fully managed due to the best-effort nature of the Internet, the user experience can be predicted (an optimized) by routing media streams through media gateways that match the suggested (or required) criteria.

FIG. 1 illustrates a first example Environment 100 in which aspects of the present disclosure can operate. In Environment 100, a First User 130 connects to an online or networked-based communication session with one or more Additional Participants 132. Such online communication sessions are typically hosted or otherwise provided by a third-party service (e.g., a mobile or web application for transmitting audio, visual, or audiovisual data between participants). In the context of FIG. 1, the network-based communication session is transmitted over Internet 102, although it is understood that various other networking protocols and techniques may be employed without departing from the scope of the present disclosure.

Within Environment 100, a cloud-based third-party communication service provider (not illustrated) provides three Media Gateways 112, 114, and 116 that are connected to the Internet 102. It is noted that the three Media Gateways are provided at geographically distinct locations. For example, although FIG. 1 is not drawn to scale, First User 130 is in closer geographic proximity to Media Gateway 112 than to Media Gateway 114, and the Additional Participants 132 are in closer geographic proximity to Media Gateway 114 than to Media Gateway 112. Neither First User 130 nor Additional Participants 132 have Media Gateway 116 as their media gateway in closest geographic proximity.

Under one conventional theory of network routing and operation, an incoming user request will be routed to the media gateway that is closest to the user's geographical location. As illustrated, an incoming request from First User 130 to establish a communication session would be routed to Media Gateway 112. Similarly, an incoming request from Additional Participants 132 to establish a communication session would be routed to Media Gateway 114. Under this theory, an incoming request from either First User 130 or Additional Participants 132 would not be routed to Media Gateway 116 as long as Media Gateway 112 and 114 continue to remain available.

However, such an approach is limited by its failure to consider any factors beyond geographical proximity when making routing decisions. For example, the path comprising Segments 146a and 146b utilizes the closest media gateway to First User 130 and Additional Participants 132, respectively, but it can often be the case that the path comprising Segments 142a and 142b may provide a communication session with less delay, even though Media Gateway 116 is farther away from First User 130 than Media Gateway 112.

Such a situation might arise if Media Gateway 116 has more available bandwidth than Media Gateway 112, is outfitted with higher speed components, is provided on a higher speed communication link, and various other factors that will be appreciated by one of ordinary skill in the art.

Furthermore, in some scenarios, total delay might not be the most important determining factor. For example, jitter may be a more important factor than delay, particularly in the case of a communication session that transmits video data. In this scenario, the most desirable path for connecting First User 130 and Additional Participants 132 to a communication session would be Path 144, which causes both parties to make use of the same Media Gateway 114. Even though this is the farthest media gateway from First User 130, it can nevertheless be the most desirable gateway to be utilized in a given communication session.

Figure 2:
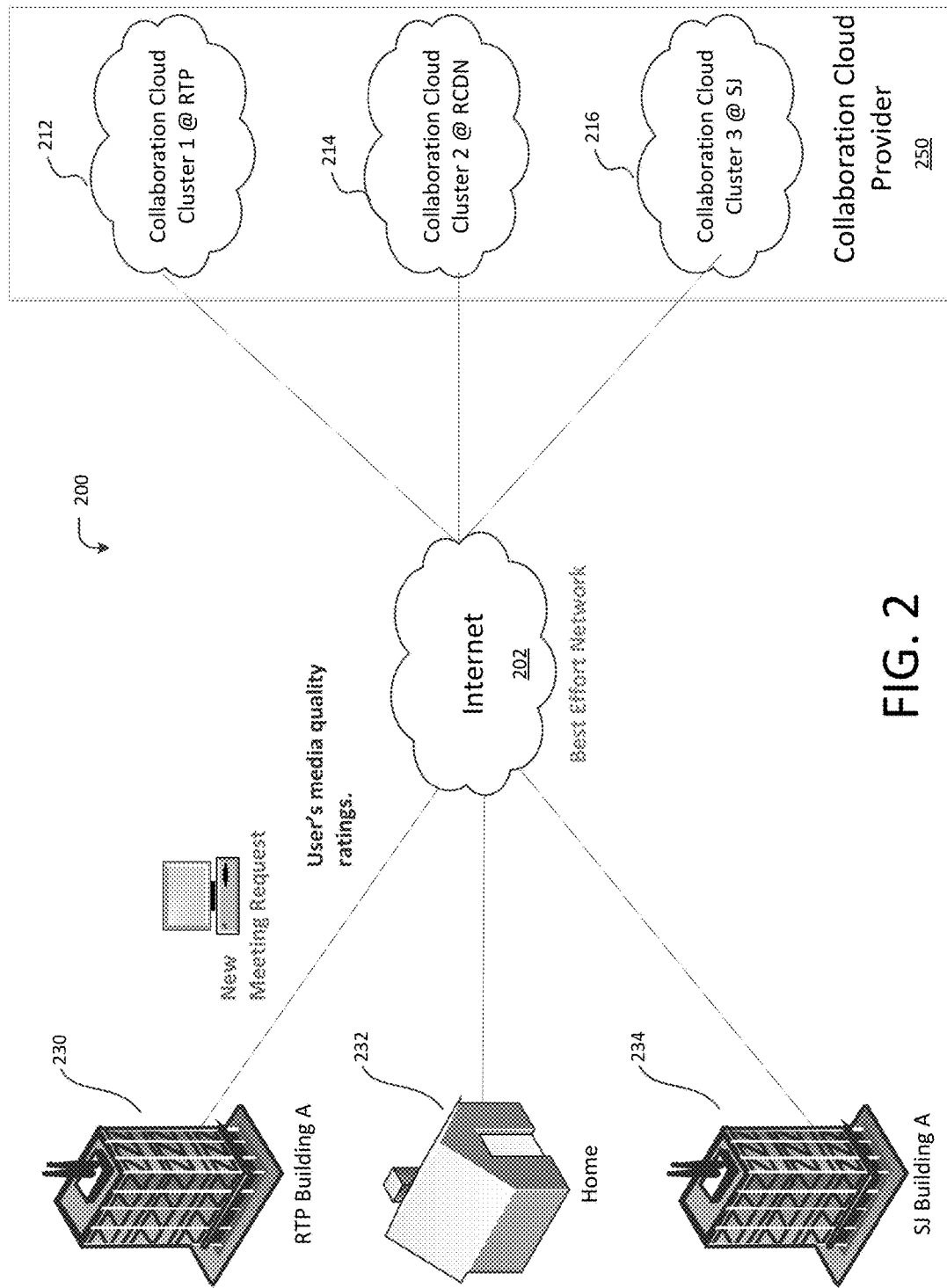
FIG. 2 illustrates an example environment in which aspects of the present disclosure can operate.

FIG. 2 illustrates a second example Environment 200 in which aspects of the present disclosure may operate. Unlike Environment 100, where the constituent Media Gateways 112, 114, 116 of a communication or application service provider were provided in disparate geographical locations, Environment 200 depicts a collaboration Cloud Provider 250 with constituent Media Gateways (labeled herein as Collaboration Cloud Clusters) 212, 214, 216 that are provided in the same geographical location, or in the same geographical location as an associated user location. This enables collaboration Cloud Provider 250 to achieve a greater degree of control, oversight, and predictability over the performance of the Individual Clusters 212, 214, 216 as well as the performance of the overall communication or collaboration service that is provided by these clusters.

However, collaboration Cloud Provider 250 remains unable to account for or control various mitigating factors on the customer or participant end. That is, users of collaboration Cloud Provider 250 (e.g. participants in communication sessions) might all experience different qualities of service. Users might be disposed at different geographic and physical locations, such as RTP Building A (referred to herein as Building 230), Home 232, and SJ Building A (referred to herein as Building 234). Each geographic location might be associated with a different network provider or ISP, a different network type (wired, wireless, cellular), a different network quality, a different network load factor, and so on. Each user might be associated with a different type of device, with different properties and capabilities. In short, a variety of factors can influence the end-to-end transmission of a communication session, including the fact that the communication session must traverse Internet 202, which is an unpredictable, best-effort network.

Even in scenarios in which all user-controlled variables remain constant (e.g. a user joins the same video conference every Monday at 9 AM, using his desktop, from Building 230, and connecting to collaboration Cloud Cluster 212), a wide range of performance characteristics can be experienced in terms of the perceived quality of the video conference, due to factors that are both beyond the user's control and beyond the user's ability to see.

For example, on a given Monday where the user experiences degraded quality, a higher than normal number of users in Building 230 might be attending meetings also scheduled to run concurrently with the user's 9 AM video conference. Hence, the network media path between the user's desktop and collaboration Cloud Cluster 212 might experience bandwidth problems due to the high number of media flows. Alternatively, collaboration Cloud Cluster 212 might be handling a large number of meetings from different companies, such that the bandwidth of collaboration Cloud Cluster 212's WAN link to its Internet Service Provider is saturated due to the high number of media flows. As a further alternative, other application flows within the Internet Service Provider environment might be impacting the user's perceived quality of his video conference. For example, the Internet Service Provider might be handling a large number of IP media streams for a famous TV show at 9 AM, where the IP media streams are from a content provider cloud in the same geographic location as collaboration Cloud Cluster 212, such that the content provider cloud connects to the same core network of the Internet Service Provider.

Accordingly, in one aspect of the present disclosure, participants in a video conference or other online communication session are asked to provide a quality rating after the communication session has ended. An example of such quality ratings is seen in FIG. 5. As will be discussed later, these received user quality ratings are associated with their corresponding network, conference, and other parameters, and are then stored for subsequent use.

Figure 3:
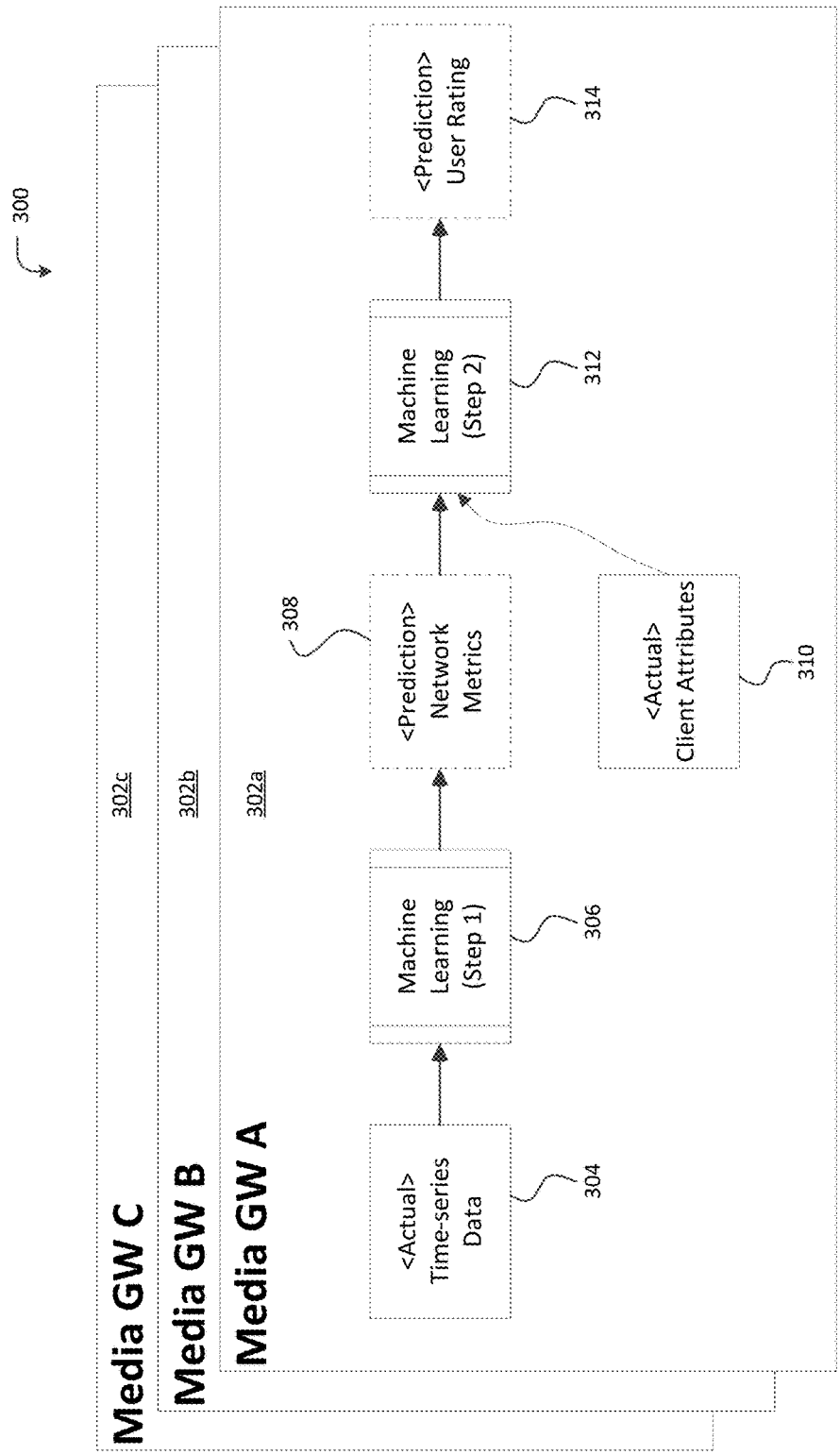
FIG. 3 illustrates an example modeling and quality prediction process.

FIG. 3 illustrates an example two-step modeling and quality prediction method 300 of the present disclosure. The method is applied to one or more media gateways of the illustrated Media Gateways 302a, 302b, 302c, that are coupled to or otherwise associated with a network, with the end result being that a User Rating 314 of the quality provided by a given media gateway can be predicted given the inputs of current network state 304 and current Client Attributes 310. In this manner, a user request to join or initiate a communication session can be routed to the media gateway that will yield the highest predicted user rating. It is noted that the method is applied to one media gateway at a time, although multiple media gateways can be analyzed in parallel.

Figure 4A:
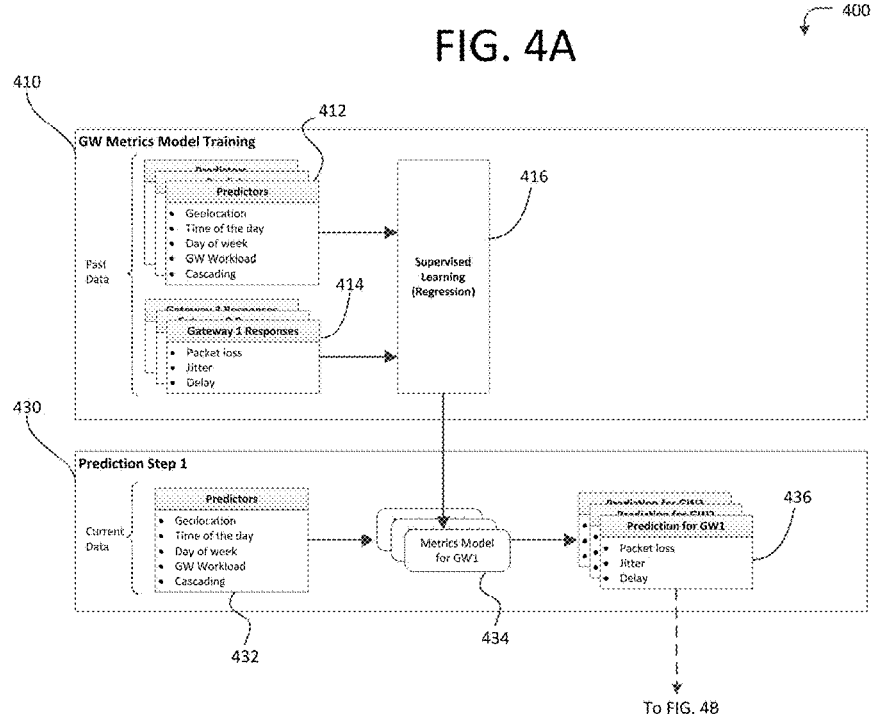
FIG. 4A illustrates an example architecture and associated information flow associated with a method of the present disclosure.
Figure 4B:
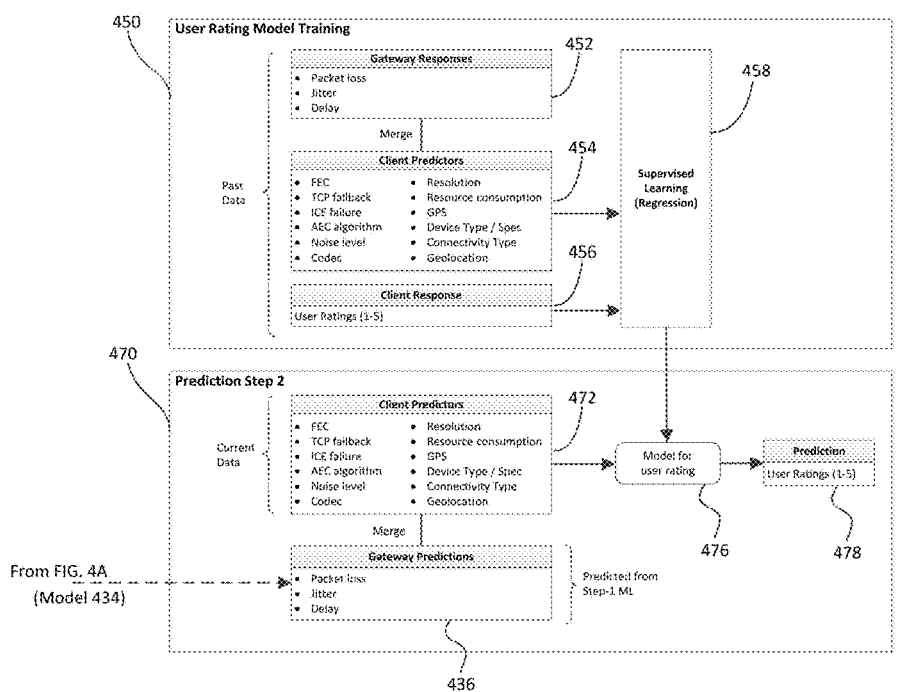
FIG. 4B illustrates additional components of the example architecture and associated information flow of FIG. 4A.

FIG. 3 provides a high-level overview of the processing and data flows that are discussed in greater depth with respect to FIGS. 4A and 4B. The two inputs of current time-series Network Data 304 and current Client Attributes 310 can be received simultaneously, although this is not required. The current Network State 304 is fed into a First Machine Learning Module 306, which generates predicted Network Metrics 308 for the given media gateway being analyzed, where the predicted Network Metrics 308 are based on the current Network Data 304. First Machine Learning Module 306 is operable to perform this function because it is trained on a series of historical network state data, as will be described below. In general, the current Network Data 304 encompasses a wider variety of parameters than the predicted Network Metrics 308. In some embodiments, the predicted Network Metrics 308 can be thought of as the factors upon which user rating is based—e.g. packet loss, delay, jitter.

A Second Machine Learning Module 312 receives these predicted Network Metrics 308, as well as the current Client Attributes 310. Second Machine Learning Module 312 then generates the predicted User Rating 314 corresponding to the given media gateway being analyzed (which here is Media Gateway 302a), where the predicted User Rating 314 is based on both the predicted Network Metrics 308 and the current Client Attributes 310. Second Machine Learning Module 312 is operable to perform this function because it is trained on a series of historical network metrics, user attribute data, and user rating data, as will be described below.

FIG. 4A illustrates an example architecture and associated information Flow 400 associated with a method of the present disclosure. In particular, FIG. 4A presents a detailed view of the first step of the two-step modeling process described in FIG. 3, as applied to any given media gateway. Recalling that this first step corresponds to generating predicted network metrics for the given media gateway, e.g. predicted gateway metrics, illustrated are a Gateway Metrics Model Training Module 410 and Gateway Metrics Prediction Module 430.

Gateway Metrics Model Training Module 410 is operable to train the First Machine Learning Module 416 on a series of historical time-series network data. This historical time-series network data comprises, as illustrated, Network Predictors 412 and Gateway Response 414. While the predicted gateway metrics are generated for a single given media gateway, the gateway metrics model training is performed over all media gateways. Continuing the example set by FIG. 3, where three media gateways are present, there are three sets of Network Predictors 412 and three sets of Gateway Response 414 received at Gateway Metrics Model Training Module 410. These network predictors and gateway responses can be stored in a database that is coupled to the network, such that the network and its constituent components can be polled in order to collect or refresh one or more of the network predictors and gateway responses.

The Network Predictors 412 include geographic location, time of day, day of week, gateway workloads, and cascading information, although it is appreciated that the Network Predictors 412 can comprise additional factors that influence the performance of a media gateway. The Gateway Response 414 are the metrics that result due to various combinations of network predictors. That is, the Gateway Response 414 are factors such as packet loss, jitter, and delay that are influenced by the Network Predictors 412.

In some instances, a user can specify a threshold of historical data (e.g. Network Predictors 412 and Gateway Response 414) that must be collected in order for the First Machine Learning Module 416 to be trained. In other words, a user can specify a minimum amount of time that data must span in order for adequate analysis and predictions to be performed. For example, a threshold for the minimum amount of historical data that must be collected in order to detect patterns and make predictions might be four weeks. This can alternatively be referred to as a pattern threshold.

Another type of threshold might also be provided—a lifetime threshold. The lifetime threshold can be employed to remove stale data, as networks evolve over time and may not be adequately or accurately characterized by performance data that are too old. For example, the lifetime threshold might be 90 days. Any data, of either network predictors or gateway responses, that was collected more than 90 days ago will be removed. In another example, a threshold might be a change in hardware or software (e.g., upgrade, replacement, etc.) in a Media Gateway and/or Radio Access Network (RAN) should invalidate the relevant leanings (e.g., the prediction may not be right after such changes).

In essence, the Network Predictors 412 and the Gateway Response 414 are provided as data that are causally linked to one another—but no indication of this causal link is provided. This is the purpose of the First Machine Learning Module 416, which utilizes Network Predictors 412 and Gateway Response 414 as a training data set to perform machine learning and construct a predictive model of the causal link between the two inputs. The First Machine Learning Module 416 can be provided in some embodiments as a regression module, although other machine learning techniques may additionally be employed without departing from the scope of the present disclosure.

First Machine Learning Module 416 then outputs a predictive model of Gateway Metrics 434 for each of the gateways represented in Network Predictors 412 and gateway responses. In some embodiments, First Machine Learning Module 416 may generate a single predictive model of gateway metrics, rather than generating a predictive model for each gateway.

From here, the Gateway Metrics Model Training Module 410 outputs the one or more predictive models to the Gateway Metrics prediction module 430. Gateway Metrics Prediction Module 430 receives as input, or utilizes a polling service to collect in real-time, a snapshot of the current Network Predictors 432. As illustrated, the parameters contained within the current Network Predictors 432 are similar to those contained within the historical Network Predictors 412, although it is appreciated that the two are not necessarily the same.

The current Network Predictors 432 are then input into the one or more predictive models 434 for each media gateway. The one or more Predictive Models 434 generate a corresponding one or more predicted Gateway Metrics 436 for each gateway being analyzed. As illustrated, the parameters contained within the predicted Gateway Metrics 436 are similar to those contained within the historical Gateway Response 414, although it is appreciated that the two are not necessarily the same.

While it is possible to measure the actual gateway metrics right before a communication session, rather than relying upon predicted Gateway Metrics 432, the measurement of the actual gateway metrics is momentary, and therefore has limited use beyond the time at which they are captured. Relying upon the capture of actual gateway metrics before a communication session fails to account for any potential fluctuation or other variations that commonly occur over the course of a communication session. On the other hand, the one or more Predictive Models 434 advantageously enables the gateway metrics to predicted over the entire duration of the communication session. Keeping in mind that a goal is to select the appropriate media gateway for an incoming request for a communication session, it is clear that the ability to understand the gateway metrics over the whole duration of a communication session is far more valuable that simply measuring the gateway metrics at the initiation of a communication session.

As a simplified example, consider the following. At 8:59 AM, a user transmits a request to join a 9 AM video conference. At 8:59 AM, Media Gateway B has low delay and is utilizing only 10% of its bandwidth. Media Gateway A has moderate delay and is utilizing 50% of its bandwidth. A media gateway selection based only upon a snapshot of actual gateway metrics would select Media Gateway B to handle the user request to join the 9 AM video conference.

However, it may be the case that Media Gateway B historically sees a bandwidth utilization in excess of 90% from the hours of 9 AM to noon, while Media Gateway A does not historically see any bandwidth utilization changes. In this case, it is appreciated that it would be preferable to select Media Gateway A to handle the user's request to join the 9 AM video conference, rather than Media Gateway B. This is because over the entire duration of the video conference, Media Gateway A will likely offer a better, higher quality experience than Media Gateway B, even though Media Gateway B is instantaneously offering better connection parameters.

Unlike conventional approaches, the disclosed system and method leverage historical time-series data of network metrics and predictors to perform more sophisticated analysis and ultimately, provide superior gateway selection. This gateway selection process is described with respect to FIG. 4B, which illustrates an additional portion 401 of the architecture and associated information flow 400 that is depicted in FIG. 4A. In particular, FIG. 4B presents a detailed view of the second step of the two-step modeling process described herein. Illustrated are a User Rating Model Training Module 450 and a User Rating Prediction Module 470.

User Rating Model Training Module 450 is operable to train the Second Machine Learning Module 458 on a series of historical data. This historical data includes Gateway Responses 452 (which can be similar to the Gateway Response 414 of FIG. 4A), Historical Client Predictors 454, and Historical Client Responses 456. As illustrated, a single model is generated for all users or clients, although it is understood that unique models could be generated for each given user or client, in the same manner in which unique models were generated for each gateway in FIG. 4A.

The Gateway Responses 452 and the Client Predictors 454 are merged into a single set of state parameters that have a causal relationship with the Historical Client Responses 456. That is, the combination of a given gateway response and given set of client predictors yielded a corresponding client response. An example of such a data set is illustrated as Data Set 500 of FIG. 5, which shows a column labeled 'User Rating'. As described with respect to FIG. 4A, a user may specify a pattern threshold and a lifetime threshold to the historical data that is collected.

The Second Machine Learning Module 458 receives as input the merged Client Predictors 454 and Gateway Responses 452, and the client responses 456. These inputs are used as a training data set to perform machine learning and construct a predictive model of the causal link between gateway responses and client predictors as input and client responses as output. The Second Machine Learning Module 458 can be provided in some embodiments as a regression module, although other machine learning techniques may additionally be employed without departing from the scope of the present disclosure.

Second Machine Learning Module 458 then outputs a Predictive Model 476 for user ratings. This Predictive Model 476 is received at the user rating prediction module 470. User rating Prediction Module 476 receives as an additional input, or utilizes a polling service to collect in real-time, a snapshot of the current Client Predictors 472. As illustrated, the parameters contained within the current Client Predictors 472 are similar to those contained within the historical Client Predictors 454, although it is appreciated that the two are not necessarily the same.

The current Client Predictors 472 are then merged with the predicted Gateway Metrics 436 output from model 434 of Gateway Metrics prediction module 430 of FIG. 4A. The merged list is then input into the model 476 for user rating, which is specifically designed to predict an output user rating based on an input of client predictors and gateway metrics. In this manner, the model 434 generated by First Machine Learning Module 416 is fed forward as input to the model 476 generated by Second Machine Learning Module 458.

With these inputs, the user rating model 476 generates a predicted user rating 478, for the given media gateway given the prevailing current conditions of Network Predictors 432 and Client Predictors 472. This process is performed for each media gateway that is being investigated for a predicted user rating given the current conditions. Ultimately, a predicted user rating is generated for each media gateway being considered (e.g. all available media gateways when a user request is received). With these predicted user ratings, a selection is then made, such that a user request to initiate or join a communication session is handled by the media gateway that will result in the highest predicted user rating, even if this media gateway would not have otherwise been selected by conventional methods.

Consider the following example, which returns to the example described in FIG. 1. Assume that a communication session provider is operating the three Media Gateways 112, 114, and 116, and that the communication session provider receives a new communication session request from the First User 130. Media Gateway 112 is in Raleigh, Media Gateway 114 is in RTP, and Media Gateway 116 is in San Jose. First User 130 is also in RTP, and is using a mobile device at 4:30 PM on a Friday. Also assume that a gateway metrics model and a user rating model have been trained by the first and second machine learning modules, respectively, using historical data from sessions processed in the last 90 days.

The first step is to predict the gateway metrics {Packet Loss, Delay, Jitter} for each gateway using the trained gateway metrics model.

Input Features:
   Gateway 112: {RTP-Raleigh, 4:30 PM, Friday, 20% workload}
   Gateway 114: {RTP-RTP, 4:30 PM, Friday, 80% workload}
   Gateway 116: {RTP-San Jose, 4:30 PM, Friday, 75% workload}

Output of gateway metrics prediction model {Packet Loss, Delay, Jitter}:
   Gateway 112: {0, 50 ms, 20 ms}
   Gateway 114: {10, 50 ms, 20 ms}
   Gateway 116: {5, 100 ms, 20 ms}

The second step is to predict the user rating for each media gateway using the trained user rating model. The predicted gateway metrics from step one, above, are combined with client parameters to form the input to the user rating model Input Features:
   Gateway 112: {RTP-Raleigh, 4:30 PM, Friday, 20% workload, (0, 50 ms, 20 ms)}
   Gateway 114: {RTP-RTP, 4:30 PM, Friday, 80% workload, (10, 50 ms, 20 ms)}
   Gateway 116: {RTP-San Jose, 4:30 PM, Friday, 75% workload, (5, 100 ms, 20 ms)}

Output of user rating prediction model:
   Gateway 112: 5 (Excellent)
   Gateway 114: 3 (Moderate)
   Gateway 116: 4 (Good)

Final Selection:
   Gateway 112 in Raleigh is selected and assigned for the incoming communication request from the mobile device of user 130 in RTP. In instances where two or more gateways have the same rating, a selection can be made by assigning a higher ranking to the gateway with the closest geographic proximity to the user.

Disclosed is a system and method to forecast the expected voice/video quality of a call. The system and method can apply predictive models on historically collected network metrics. The system and method can also predict how the user may rate the call experience, and provide major contributing factors. These factors can be used to take proactive action to improve the call experience and make the related information available through an application in the event that UE (user equipment) designers wish to display call experience reason information to the user.

Figure 6:
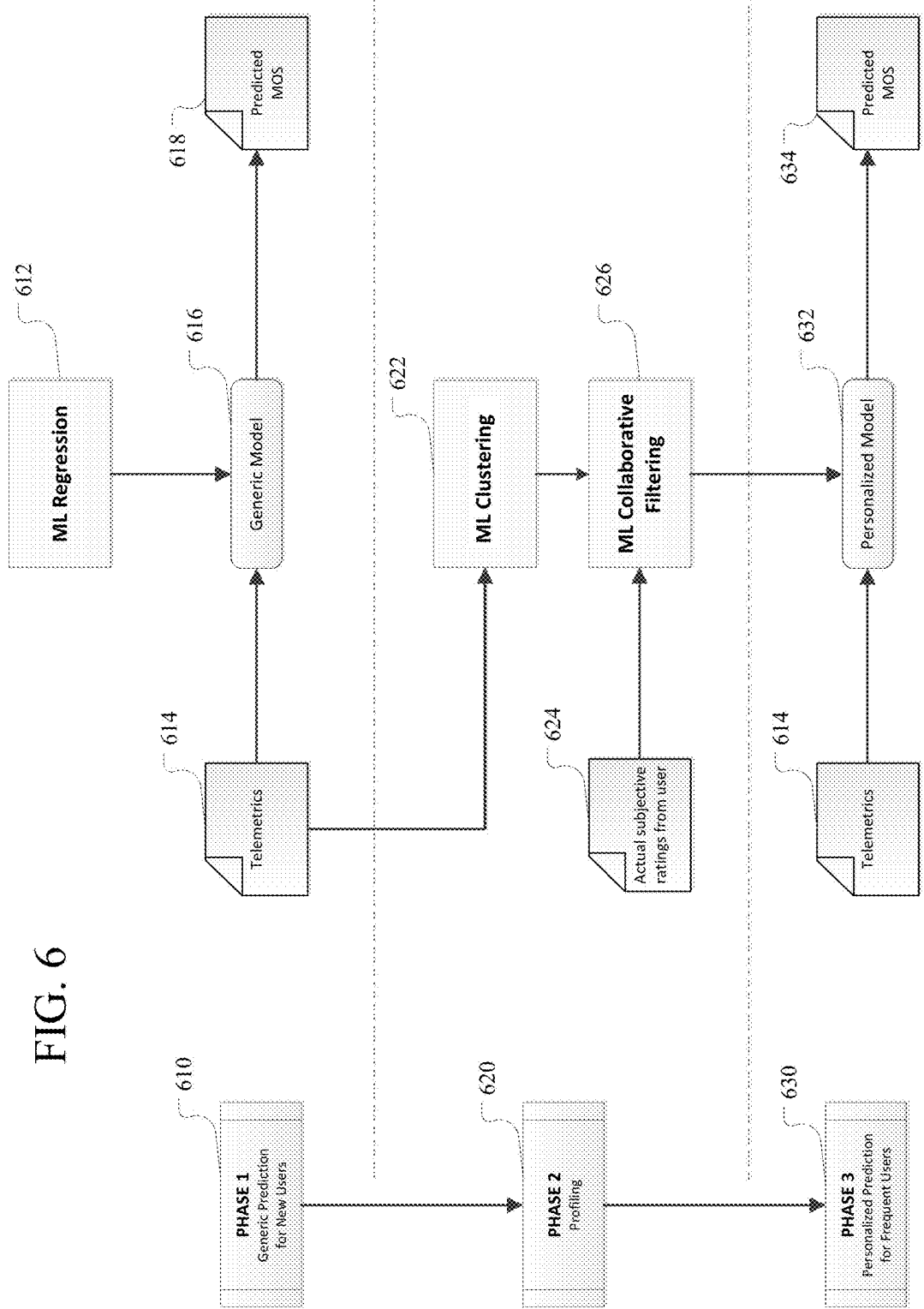
FIG. 6 illustrates a schematic diagram of an example system for forecasting an expected call quality.

FIG. 6 shows a schematic diagram of an example system for forecasting an expected call quality. The system can involve Phase 1 (610) for generating a generic prediction for a new user in the system, Phase 2 (620) for profiling the user, and Phase 3 (630) for generating a personalized prediction for the user.

At Phase 1 (610), when a new user without prior rating feedback enters the system, the user's ratings can be predicted based on Generic Model 616. Generic Model 616 can be generated based on Telemetrics 614 and trained with Regression Algorithm 612 using Telemetrics 614 as input. In some cases, Generic Model 616 can also be pre-trained with Regression Algorithm 612 using the historical feedback of users in the system. Regression Algorithm 612 can rank the importance of one or more factors contributing to call quality. Non-limiting examples of regression algorithms can include Decision Trees, Random Forest and Extreme Gradient Boosting.

Telemetrics 614 can include new type of metrics (e.g., device specification, wireless signal stability, user travel speed, geographic location, etc.) collected for one or more networks and/or calls. In some cases, Telemetrics 614 can be collected periodically on an ongoing basis. Telemetrics 614 can include metrics associated with the quality of a call, such as jitter, packet loss, round trip time (RTT), etc. Table 1 below illustrates non-limiting examples of metrics.

TABLE 1

Example Metrics

| GROUP | ATTRIBUTE |
| --- | --- |
| Network | Latency |
| | Packet loss burst length |
| | Jitter |
| | Connection type |
| | Bandwidth |
| | FEC |
| | TCP fallback |
| | ICE failure |
| | Incoming queuing delay |
| | Outgoing queuing delay |
| | Wireless signal strength |
| Audio | AEC algorithm |
| | Bit rate |
| | Noise level |
| Video | Bit rate |
| | Frame rate |
| | Resolution |
| | Screen size |
| | Codec |
| | Simulcast |
| Client | User agent type |
| | Version |
| | Operating System (OS) |
| | CPU load |
| | Travel speed |
| | Geo-location |
| GPS | Travel speed |
| | Geo-location |

Generic Model 616 used to generate Predicted Mean Opinion Score (MOS) 618. MOS 618 can include one or more scores representing the predicted user's call quality rating based on Telemetrics 614.

At Phase 2 (620), after the new user spends more time with the system and provides respective feedback, the user can be profiled to generate a personalized model in Phase 3 (630), using Clustering Algorithm 622 and Collaborative Filtering Algorithm 626.

Here, one or more metrics from Telemetrics 614 can be clustered into a number of "scenarios" using Clustering Algorithm 622. In some scenarios, the audio quality may far exceed the video quality (or vice versa). In other scenarios, video resolution may be traded off for higher frames per second. For this reason, Clustering Algorithm 622 can include one or more clustering algorithms that scale well with the large volume of metrics data. Non-limiting examples of clustering algorithms include K-Means, DBSCAN, Ward hierarchical clustering, and Birch.

The clusters or scenarios generated by Clustering Algorithm 622, as well as Subjective User Ratings 624, can be passed to Collaborative Filtering Algorithm 626 to generate results for the clusters or scenarios which can be used to create Personalized Model 632 in Phase 3 (630).

Subjective User Ratings 624 can include actual, subjective past ratings from a user. In some cases, Subjective User Ratings 624 can be grouped and averaged into each corresponding scenario. The dataset can be formatted into a rating matrix for Collaborative Filtering Algorithm 626. Collaborative Filtering Algorithm 626 can be a machine learning algorithm which can provide recommendations and/or pivoted to approximate how a user may rate a call under a scenario. Each row in the rating matrix can be effectively a profile for a user and each profile may have different levels of completeness. To evaluate whether a user is ready to switch from Generic Model 616 to a personalize model (e.g., Personalized Model 634), a threshold of the level of completeness may be expected to put in place (e.g. 25%).

At Phase 3 (630), Telemetrics 614 and the output from Collaborative Filtering Algorithm 626 can be used to generate Personalized Model 632 for the user. Personalized Model 632 can be a predictive machine learning model that is personalized for the user in order to take into account the user's subjective ratings, recognizing that users may rate the same call experience in different ways. Personalized Model 632 can generate Personalized Predicted MOS 634, which can include an MOS score representing a predicted user rating of the call experience that is personalized for the particular user.

In some cases, if an upcoming scenario defined by Telemetrics 614 has been experienced and rated in the past by the user, then Personalized Predicted MOS 634 can be adapted from past ratings (e.g., Subjective User Ratings 624). If the scenario is otherwise new to the user, Collaborative Filtering Algorithm 626 can match Subjective User Ratings 624 against other users and find users with similar rating behaviors. The existing ratings of those users for the specific scenario can be used to predict the rating of this particular user (e.g., Personalized Predicted MOS 634).

Figure 7A:
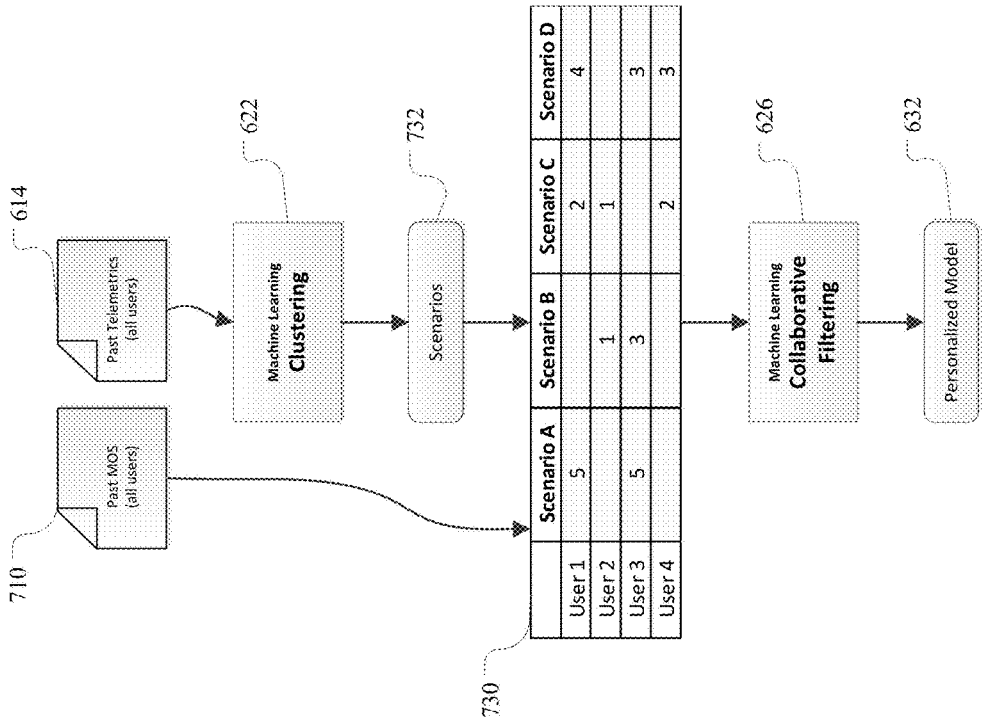
FIG. 7A illustrates a diagram of an example process for generating a generic model for forecasting expected call quality.

FIG. 7A shows a diagram of an example process for generating Generic Model 616. In this example, Telemetrics 614 and MOS Scores 710 can be used to generate Matrix 720 mapping individual MOS scores from MOS Scores 710 to example metrics from Telemetrics 614. Telemetrics 614 can include past or historical telemetrics from users in the system and MOS Scores 710 can include past or historical MOS scores from the users. In some cases, Telemetrics 614 and MOS Scores 710 can include the telemetrics and MOS scores aggregated from all users in the system.

Matrix 720 can be provided as input for Regression Algorithm 612 to generate Generic Model 616, which can represent a model generalizing MOS scores and telemetrics for the users in the system.

Figure 7B:
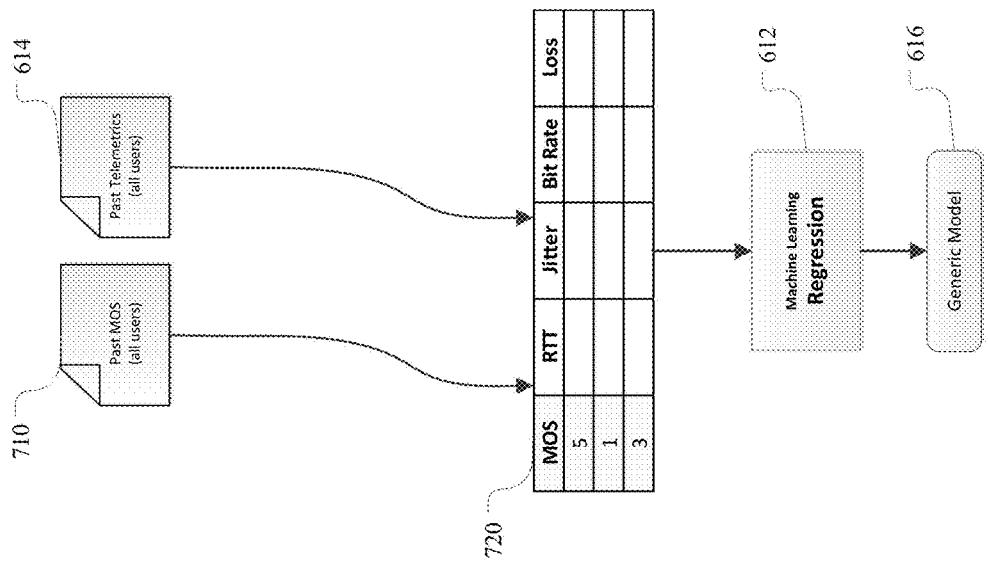
FIG. 7B illustrates a diagram of an example process for generating a personalized model for forecasting expected call quality.

FIG. 7B shows a diagram of an example process for generating Personalized Model 632. In this example, Telemetrics 614 can be provided as input to Clustering Algorithm 622 to generate Scenarios 732. Scenarios 732 can be based on clusters of metrics from Telemetrics 614. Scenarios 732 and MOS Scores 710 can then be used to generate Rating Matrix 730.

Rating Matrix 730 can map individual MOS scores to individual scenarios for each user. The mappings in Rating Matrix 730 can represent respective profiles for the users. The profiles can approximate how each user may rate a call under each scenario. Rating Matrix 730 can then be provided as input to Collaborative Filtering Algorithm 626 to generate Personalized Model 632. As previously mentioned, Personalized Model 632 can provide a personalized machine learning model for predicting call ratings for a particular user.

Figure 8:
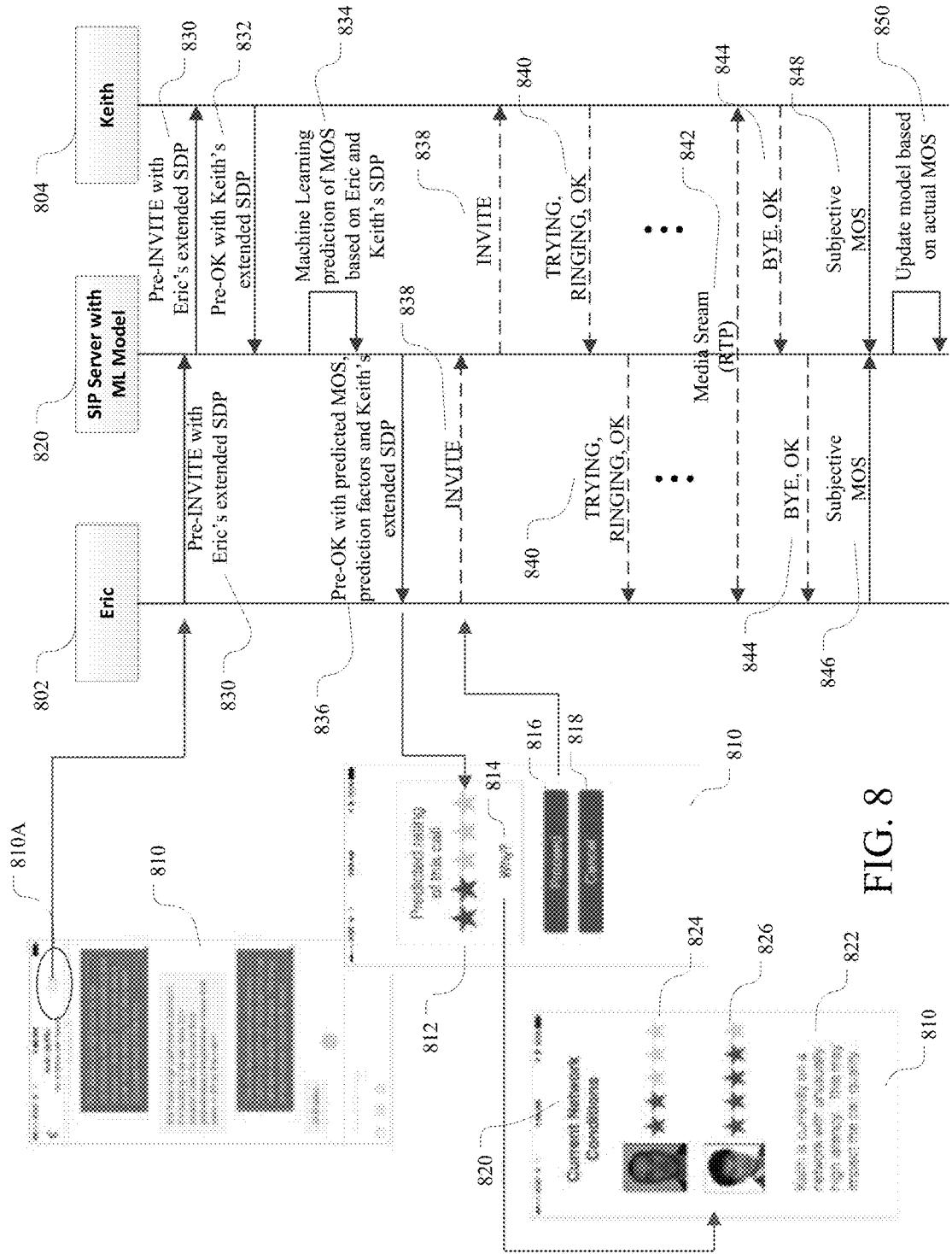
FIG. 8 illustrates a diagram of an example of a predictive modeling use case.

FIG. 8 shows a diagram of an example of a predictive modeling use case. The example predictive modeling use case is implemented for a call between users Eric 802 and Keith 804. Graphical User Interface 810 can be presented to Eric 802 on his communication device (e.g., mobile phone, tablet computer, etc.). Graphical User Interface 810 can include Control 810A for establishing a call, such as a VoIP call, with other users. In this example, Control 810A is presented in association with contact information for Keith 804, and allows Eric 802 to establish a call to Keith 804 based on the contact information for Keith 804.

When Eric 802 selects Control 810A to establish a call with Keith 804, Control 810A can trigger the communication device to generate and send Pre-Invite Packet 830 to Server 820, which then sends Pre-Invite Packet 830 to a communication device associated with Keith 804. Pre-Invite Packet 830 can include one or more parameters corresponding to an extended session description protocol (SDP) associated with Eric 802. An example of an extended SDP is further described below with reference to FIG. 9.

The communication device associated with Keith 804 can receive Pre-Invite Packet 830 and reply to Server 820 with Pre-OK Packet 832. Pre-OK Packet 832 can include one or more parameters corresponding to an extended SDP associated with Keith 804.

Server 820 can receive Pre-OK Packet 832 and collect telemetrics and perform a practice or "dry" run to predict call quality before actually establishing the call. Server 820 include one or more conferencing servers or bridges, such as a SIP (Session Initiation Protocol) server, configured to perform call quality or experience forecasting using machine learning models, such as Generic Model 816 and Personalized Model 832, as previously explained.

In this example predictive modeling use case, Server 820 host and/or establish communication sessions (e.g., video/audio calls such as VoIP) using SIP or a SIP-like protocol. SIP is used in this example for clarity and explanation purposes. It should be noted that other examples or servers may implement other communication protocols either in combination to SIP or in lieu of SIP, such as, without limitation, H.323.

Moreover, the signaling protocol implemented by Server 820 can be extended to process "pre-INVITE" packets (e.g., Pre-Invite Packet 830) and "pre-OK" packets (e.g., Pre-OK Packet 832) without actually triggering a call. Thus, Pre-Invite Packet 830 and Pre-OK Packet 832 can serve as "pre-signaling" packets which enables Server 820 to perform a practice or "dry" run call to collect relevant metrics from other call legs, including call legs corresponding to one or more callees intended by the caller, which in this example is Eric 802. Taking the metrics and conditions of all callees into account, Server 820 can more accurately predict the likely quality of a conference call. The metrics used to make machine learning based predictions can be passed to Server 820 through the attributes represented as 'a' in standard SDP.

Server 820 can provide machine learning and prediction services before, during, and/or after a call. To illustrate, after receiving Pre-Invite Packet 830 and Pre-OK Packet 832 from Eric 802 and Keith 804, respectively, Server 820 can collect metrics and generate Predicted MOS 834 based on the SDP associated with Eric 802 and Keith 804. Predicted MOS 834 can be a machine learning prediction based on one or more machine learning models, such as Generic Model 816 and Personalized Model 832. In this example, Predicted MOS 834 can be a machine learning prediction generated based on Generic Model 816 and telemetrics associated with other users in the system, such as Predicted MOS 818 generated at Phase 1 (610) as previously described with reference to FIG. 6.

Based on Predicted MOS 818, Server 820 can send Predicted Pre-OK Packet 836 to Eric 802. Predicted Pre-OK Packet 836 can include Predicted MOS 818, the extended SDP of Keith 804, as one as one or more prediction factors. The communication device used by Eric 802 can receive Predicted Pre-OK Packet 836 from Server 820 and update Graphical User Interface 810 to display or visualize Predicted Rating 812, which can convey a rating predicted for the call based on Predicted Pre-OK Packet 836, including information in Predicted Pre-OK Packet 836 such as Predicted MOS 818, the extended SDP of Keith 804, and/or the one or more prediction factors.

Graphical User Interface 810 can also present Selectable Controls 814, 816, 818, which can provide various options to Eric 802. For example, Control 816 can be a selectable control that Eric 802 can select to proceed with the call, and Control 818 can be a selectable control that allows Eric 802 to cancel the call. Control 814 can be a selectable control which provides Eric 802 an option to retrieve and view additional information pertaining to Predicted Rating 812.

To illustrate, Control 814 can include text (e.g., "Why", "Additional Details", "Reason", "Expand", "Explore", etc.) indicating that Control 814 is operable to generate a further inquiry for additional information or details pertaining to Predicted Rating 812, such as prediction and/or rating information and description, conditions associated with Predicted Rating 812, contributing factors associated with Predicted Rating 812, network information, call information, status information, etc. If Eric 802 selects Control 814, Graphical User Interface 810 can retrieve and/or display additional information about Predicted Rating 812. For example, in response to a selection of Control 814, Graphical User Interface 810 can present Current Network Conditions View 820 which can provide information and data about network conditions detected.

Current Network Conditions View 820 can include Description 822 explaining one or more factors (e.g., negative and/or positive) that contributed to Predicted Rating 812. In this example, Description 822 indicates "Keith is currently on a network with unusually high latency. This may impact the call quality". Thus, Description 822 describes to Eric 802 a network condition that can impact the quality of the call and consequently the rating(s) in Predicted Rating 812. Graphical User Interface 810 can also present Respective Rating Information 824, 826 for the users in the call, which in this example include Eric 802 and Keith 804. To illustrate, Graphical User Interface 810 can present Respective Rating Information 824 conveying a predicted rating or experience for Keith 802 based on metrics affecting the call experience for Keith 802 (e.g., network conditions, device status, etc.), and Respective Rating Information 826 conveying a predicted rating or experience for Eric 802 based on metrics affecting the call experience for Eric 802.

As previously mentioned, Control 816 can allow Eric 802 to proceed with the call. When Eric 802 selects Control 816, the communication device associated with Eric 802 can generate and send Invite 838 to Server 820, which can relay it to the communication device associated with Keith 804. The communication device associated with Keith 804 can generate and send Response 840 to Invite 838. Response 840 can include, for example, a Trying, Ringing, and/or OK. The communication device associated with Eric 802 can send Response 840 to Server 820, which can relay to the communication device associated with Eric 802. Based on Invite 838 and Response 840, Eric 802 and Keith 804 can establish Media Stream Session 842 through Server 820.

At the end of Media Stream Session 842, the session can be terminated through a Bye and OK message. For example, the communication device associated with Keith 804 can send Bye Message 844 when Keith 804 disconnects from Media Stream Session 842. Server 820 can receive Bye Message 844 and relay it to the communication device associated with Eric 802.

Eric 802 and Keith 804 can respectively provide Subjective MOS 846, 848 to Server 820, which Server 820 can use as Input 850 for updating its machine learning model to account for actual MOS data from Eric 802 and Keith 804. Subjective MOS 846, 848 can include actual subjective ratings from Eric 802 and Keith 804. Server 820 can use Subjective MOS 846, 848 with its machine learning model to generate a personalized model (e.g., Personalized Model 632) and/or personalized predicted rating and expectation data for a call.

FIG. 9 shows an example SDP for machine learning call quality predictions. Extended SDP 902 can include Session Description Fields 904 which can include attributes and corresponding values for describing the session. Session Description Fields 904 can include one or more fields from standard SDP, such as protocol version, originator, session name, session information, email address or contact information, connection information, time information, media information, and other session attributes.

Extended SDP 902 can also include Extended SDP Fields 906 which can include other attributes and corresponding values that can be used for machine learning. For example, Extended SDP Fields 906 can include bandwidth attributes, network attributes, protocol attributes, user agent and operating system attributes, device attributes, and so forth. In some cases, one or more of the attributes from Extended SDP Fields 906 can be used to construct feature vectors for machine learning modeling and predictions as previously described.

The fields and attributes illustrated in Extended SDP 902 are non-limiting examples for explanation purposes and can vary in other configurations or examples. For example, other examples can include more or less fields or attributes in Session Description Fields 904 and/or Extended SDP 902.

Figure 10:
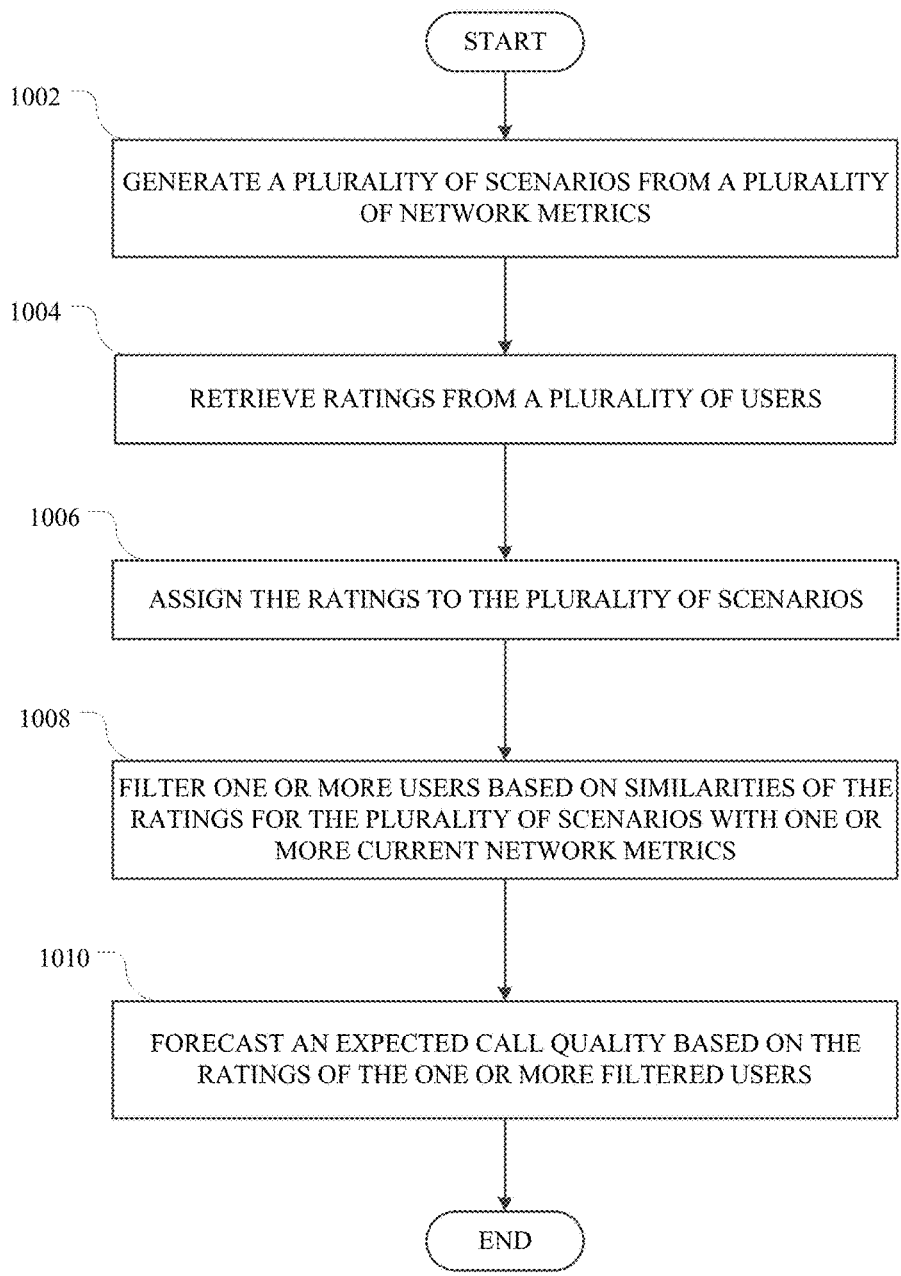
FIG. 10 illustrates an example method for forecasting an expected call quality.

FIG. 10 shows an example method for forecasting expected call quality. At step 1002, the method can involve generating a plurality of scenarios (e.g., scenarios 732) from a plurality of network metrics (e.g., Telemetrics 614). For example, a conference system (e.g., Server 620) can collect network metrics from users and input the metrics into a clustering algorithm (e.g., Clustering Algorithm 622) to generate scenarios based on the metrics.

At step 1004, the method can involve retrieving ratings from a plurality of users. The ratings can include actual, subjective ratings (e.g., Subjective Ratings 624) provided by users for previous calls. The ratings can include subjective MOS scores (e.g., Past MOS 710) from users, representing the users' call quality ratings and experiences.

At step 1006, the method can involve assigning the ratings to the plurality of scenarios. For example, the ratings from each user can be mapped to specific scenarios to generate a matrix of ratings and scenarios for users. The mappings can represent profiles for the users.

At step 1008, the method can involve filtering one or more users based on similarities of the ratings for the plurality of scenarios with one or more current network metrics. In some cases, a matrix of ratings and scenarios generated at step 1006 can be provided as an input to a collaborative filtering algorithm (e.g., Collaborative Filtering Algorithm 626) which can be used to identify users having similar rating behaviors or statistics which can be used to make predictions for a particular user with rating similarities.

At step 1010, the method can involve forecasting an expected call quality based on the ratings of the one or more filtered users. As previously mentioned, the one or more filtered users can represent users having similar rating behaviors. Thus, the ratings from the one or more filtered users can be applied to predict a rating for the particular user. While different users may experience a same call quality in different ways, users with similar experiences may provide a better approximation for a particular user having similar rating behaviors. Thus, the one or more filtered users can be used to better approximate a predicted call quality experience for the particular user.

The forecasting method can implement machine learning models for generating rating predictions for users. In some cases, a combination of a generic model and a personalized model can be used to generate a generalized prediction as well as a personalized prediction. The generic model and generalized prediction can be based on metrics and/or ratings from other users in the system, and the personalized model and personalized prediction can further take into account actual ratings from a particular user. The machine learning algorithms can be trained using telemetrics and machine learning algorithms, such as regression algorithms.

In some cases, forecasts can be updated and fine-tuned based on data collected from a particular user as well as other users. For example, the ratings of the one or more filtered users can be compared with the ratings from a particular user initiating the expected call, and the forecast can be updated based on the comparison.

Disclosed is a system and method for enabling Collaboration Service Providers to dynamically predict the occurrence of poor media quality based on historical network metrics and real-time media statistics of an active session and then proactively taking actions, such as notifying the relevant end-users such as meeting host, increasing jitter buffer at the endpoint to adapt to future network impairments etc. Some examples can include geo-location of the user, time of day, week of day, client type, connectivity type, host clusters as input features and packet loss, jitter and delay as output labels.

As shown in FIG. 2, enterprise users can collaborate with internal and external users (e.g., using virtual meetings). For example, enterprise users in different locations, such as, RTP Building A 230, Home 232 and SJ Building A 234, can collaborate (via a virtual meeting) from different geographical locations (e.g., home, office road, air) using a variety of electronic devices (e.g., smartphone, laptop, tablet, desktop, etc.) across different connectivity channels (e.g., wired, wireless, cellular, etc.).

Figure 11:
FIG. 11 illustrates a map of a travel router during an example collaboration.

FIG. 11 illustrates a map of an example collaboration (e.g., virtual meeting) as one user travels from a First Location 1102 (e.g., Elwood Primary School) to a Second Location 1104 (e.g., Melbourne Airport). In some examples, the user drops their child off at school (e.g., at First Location 1102), on a daily basis, and then travels to work (e.g., to Second Location 1104). In this example, a Route 1106 from the First Location 1102 (e.g., Elwood Primary School) to the Second Location 1104 (e.g., Melbourne Airport) consists of three roads (e.g., Alt 1, M1, M79). An Alternative Routes 1108, 1112 can use three different roads (e.g., Alt 1, M1, M2).

FIG. 12 illustrates an example historical data set 1200 used to predict quality of a collaboration based on future geolocation (e.g., of the user), meeting time, day of the week, device type, connectivity type and host cluster. In some examples, the historical data set can be collected from crowd sourcing methods, such as, network metrics from a plurality of user at different times and locations. Within a predetermined period of time before (and after) a collaboration is initiated, real-time data sets can be used to determine current quality of the collaboration. The real-time data sets can be periodically collected and stored in historical data set 1200. The combined data sets (e.g., historical and real-time) can be used to determine the possibility of media quality degradation (e.g., of the collaboration) when the user's geolocation changes (e.g., along a route, from one road to another, Alt 1 to M1, M1 to M79, etc.).

For example, when a user travels from M1 to M79, the collaboration application (e.g., virtual meeting) can inform collaboration service provider 250 of a change in geolocation. For example, Cluster1 212 can be informed of a geolocation change between M1 and M79. In response, Cluster1 212 can use the current session details of the collaboration (e.g., time, day, device type, connectivity type, host cluster) and geolocation to predict potential degradation of the collaboration (e.g., packet loss, delay and jitter). In some examples, historical data sets can also be used. The prediction can be used to determine whether there will be a poor media quality occurrence for the geolocation and the future geolocation (e.g., along the navigation path). When the prediction is of poor media quality at the geolocation or future geolocation, Cluster1 212 can Notify 1110 the user (and other participants of the collaboration) as shown in FIG. 11. In some examples, in response of a prediction of poor media quality network parameters can be adjusted to prevent future impairments (e.g., increasing jitter buffer, etc.). In some examples, the cluster can offer Alternate Routes 1108, 1112 to avoid poor media quality.

FIG. 13 illustrates a method for predicting media quality. At step 1302, a collaboration cloud can receive an indication a client device want to initiate a collaboration. For example, one or more users of client devices can have a virtual meeting at a specific time via an application (e.g., WebEx, Google Hangouts, etc.).

At step 1304, a current location and destination of the client device is determined (e.g., at the collaboration cloud). For example, the user can be dropping their child off at Elwood Primary School (e.g., Current Location, 1102) and traveling to work at Melbourne Airport (e.g., destination, 1104). At step 1306, the collaboration cloud can retrieve historical metric data and real-time network metrics. For example, the historical metric data can be retrieved from a cloud storage service, as shown in FIG. 12. The real-time network metric data can be received through one or more statistical network monitoring tools. At step 1308, the collaboration cloud can determine potential degradation in media quality for the collaboration based on the historical metric data and the real-time network metric data. For example, the historical metric data can be used to determine historical network issues (e.g., outages, congestion, jitter, latency, bandwidth, etc.) at the current location or destination at similar times and days (e.g., rush hour, no cellular towers, etc.), for example. The real-time network metric data can be used to determine current network issues at the current location and destination (e.g., outages, congestions, jitter, latency, and bandwidth etc.). The combination of the two (or in some examples one of the two) can be used to determine if the user will potentially have degraded media quality during the collaboration.

At step 1310, when potential degradation is determined, the collaboration cloud can notify the user (as shown in FIG. 11). In some examples, the collaboration cloud can recommend an alternate route without potential degradation (e.g., 1108, 1112).

Figure 14:
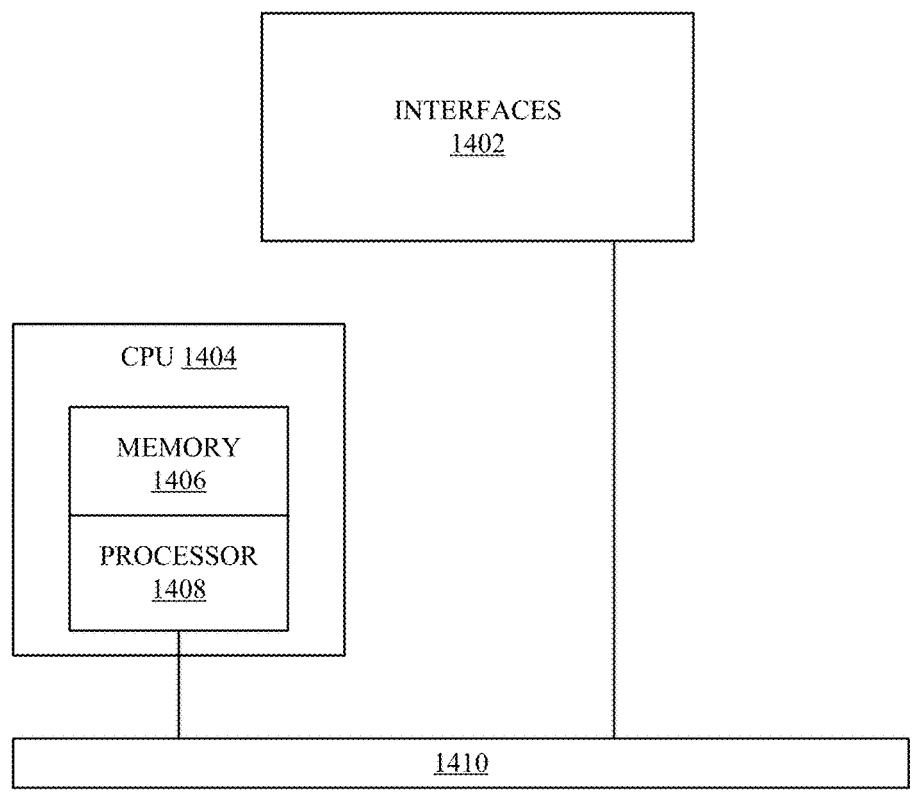
FIG. 14 illustrates an example network device.

FIG. 14 illustrates an example network device 1400 suitable for routing, switching, forwarding, traffic management, and load balancing. Network device 1400 can be, for example, a router, a switch, a controller, a server, a gateway, and/or any other L2 and/or L3 device.

Network device 1400 can include a master central processing unit (CPU) 1404, interfaces 1402, and a bus 1410 (e.g., a PCI bus). When acting under the control of appropriate software or firmware, the CPU 1404 is responsible for executing packet management, error detection, load balancing operations, and/or routing functions. The CPU 1404 can accomplish all these functions under the control of software including an operating system and any appropriate applications software. CPU 1404 may include one or more processors 1408, such as a processor from the Motorola family of microprocessors or the MIPS family of microprocessors. In an alternative embodiment, processor 1408 is specially designed hardware for controlling the operations of network device 1400. In a specific embodiment, a memory 1461 (such as non-volatile RAM and/or ROM) also forms part of CPU 1404. However, there are many different ways in which memory could be coupled to the system.

The interfaces 1402 are typically provided as interface cards (sometimes referred to as "line cards"). Generally, they control the sending and receiving of data packets over the network and sometimes support other peripherals used with the network device 1400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1404 to efficiently perform routing computations, network diagnostics, security functions, etc.

Although the system shown in FIG. 14 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

For clarity of explanation, in some instances the present technology may be presented as including individual functional blocks including functional blocks comprising devices, device components, steps or routines in a method embodied in software, or combinations of hardware and software.

Figure 15:
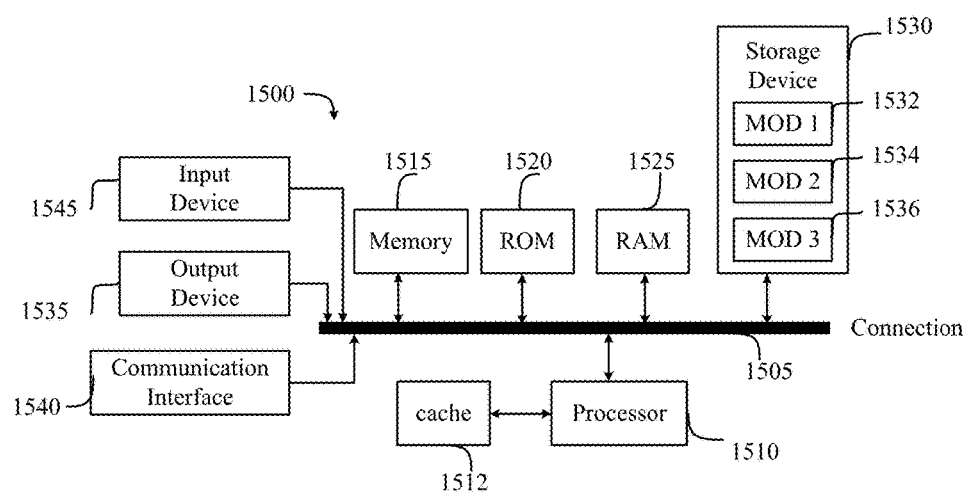
FIG. 15 illustrates an example of a system for implementing certain aspects of the present technology.

FIG. 15 shows an example of computing system 1500 in which the components of the system are in communication with each other using connection 1505. Connection 1505 can be a physical connection via a bus, or a direct connection into processor 1510, such as in a chipset architecture. Connection 1505 can also be a virtual connection, networked connection, or logical connection.

In some embodiments computing system 1500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read only memory (ROM) and random access memory (RAM) to processor 1510. Computing system 1500 can include a cache of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms known to those of skill in the art. In some instances, multimodal systems can enable a user to provide multiple types of input/output to communicate with computing system 1500. Computing system 1500 can include communications interface 1540, which can generally govern and manage the user input and system output. There is no restriction on operating on any particular hardware arrangement and therefore the basic features here may easily be substituted for improved hardware or firmware arrangements as they are developed.

Storage device 1530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for predicting media quality, the method comprising:
   receiving an indication for an initiation of a collaborative virtual meeting;
   determining a current location and destination of a client device;
   retrieving historical network metrics data and real-time network metrics data, the real-time network metrics data including day of week and current time;
   determining possible degradation in media quality of the collaborative virtual meeting for the current location and the destination based on the historical network metrics data and the real-time network metrics data; and
   notifying the client device of the possible degradation.

2. The computer-implemented method of claim 1, wherein the historical network metrics data includes location, destination, the day of the week, device type, meeting time, connectivity type, and host cluster.

3. The computer-implemented method of claim 1, wherein the real-time network metrics data further includes: device type, connectivity type, and host cluster.

4. The computer-implemented method of claim 1, further comprising:
   determining possible degradation along one or more routes between the current location and the destination; and
   notifying the client device on possible degradation along the one or more routes.

5. The computer-implemented method of claim 4, further comprising:
   providing a recommended route with the least possible degradation.

6. The computer-implemented method of claim 1, wherein the notifying includes:
   displaying on the client device a map illustrating the currently location and destination; and
   displaying alerts on the map corresponding to the notifications of possible degradation.

7. The computer-implemented method of claim 6, further comprising:
   displaying the alerts along one or more routes from the current location to the destination; and
   highlighting a route of the one or more mutes with least degradation.

8. A system comprising:
   a processor; and
   a memory storing instructions which when executed by the processor, causes the processor to:
   receive an indication for an initiation of a collaborative virtual meeting;
   determine a current location and destination of a client device;
   retrieve historical network metrics data and real-time network metrics data, the real-time network metrics data including day of week and current time;
   determine possible degradation in media quality of the collaborative virtual meeting for the current location and the destination based on the historical network metrics data and the real-time network metrics data; and
   notify the client device of the possible degradation.

9. The system of claim 8, wherein the historical network metrics data includes location, destination, the day of the week, device type, meeting time, connectivity type, and host cluster.

10. The system of claim 8, wherein the real-time network metrics data further includes: device type, connectivity type, and host cluster.

11. The system of claim 8, further comprising instructions which when executed by the processor, causes the processor to:
    determine possible degradation along one or more routes between the current location and the destination; and
    notify the client device on the possible degradation along the one or more routes.

12. The system of claim 11, further comprising instructions which when executed by the processor, causes the processor to:
    provide a recommended route with the least possible degradation.

13. The system of claim 6, further comprising instructions which when executed by the processor, causes the processor to:
    display on the client device a map illustrating the currently location and destination; and
    display alerts on the map corresponding to the notifications of possible degradation.

14. The system of claim 13, further comprising instructions which when executed by the processor, causes the processor to:
    determine one or more routes from the current location to the destination;
    display the alerts along the one or more routes; and
    highlight a route of the one or more routes with least degradation.

15. A non-transitory computer-readable medium storing instructions which when executed by a processor, causes the processor to:
    receive an indication for an initiation of a collaborative virtual meeting;
    determine a current location and destination of a client device;
    retrieve historical network metrics data and real-time network metrics data, the real-time network metrics data including day of week and current time;
    determine possible degradation in media quality of the collaborative virtual meeting for the current location and the destination based on the historical network metrics data and the real-time network metrics data; and
    notify the client device of the possible degradation.

16. The non-transitory computer-readable medium of claim 15, wherein the historical network metrics data includes location, destination, day of the week, device type, meeting time, connectivity type, and host cluster.

17. The non-transitory computer-readable medium of claim 15, wherein the real-time network metrics data further includes: device type, connectivity type, and host cluster.

18. The non-transitory computer-readable medium of claim 15, further comprising instructions which when executed by the processor, causes the processor to:
   determine possible degradation along one or more routes between the current location and the destination; and
   notify the client device on possible degradation along the one or more routes.

19. The non-transitory computer-readable medium of claim 18, further comprising instructions which when executed by the processor, causes the processor to:
   provide a recommended route with the least possible degradation.

20. The non-transitory computer-readable medium of claim 15, further comprising instructions which when executed by the processor, causes the processor to:
   display on the client device a map illustrating the currently location and destination; and
   display alerts on the map corresponding to the notifications of possible degradation.

* * * * *